United States Patent
Plath

(10) Patent No.: US 7,204,478 B2
(45) Date of Patent: Apr. 17, 2007

(54) HEIGHT CONTROL VALVE WITH UNIVERSAL MOUNTING FOR A SUSPENSION SYSTEM

(75) Inventor: Victor A. Plath, Nunica, MI (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 10/834,354

(22) Filed: Apr. 28, 2004

(65) Prior Publication Data

US 2004/0201195 A1  Oct. 14, 2004

(51) Int. Cl.
  *F16F 9/43* (2006.01)
  *B60G 17/056* (2006.01)
(52) U.S. Cl. .............................. 267/64.28; 267/64.17; 280/6.159
(58) Field of Classification Search .......... 267/DIG. 1, 267/DIG. 2, 64.16, 64.17, 64.28, 123; 280/6.157, 280/6.158, 6.159, 6.15, 6.151; 251/213, 251/231, 228, 279, 304, 315.1, 157, 170, 251/172, 175, 192; 137/595, 596, 596.1, 137/596.2
See application file for complete search history.

(56) References Cited

U.S. PATENT DOCUMENTS

| | | | |
|---|---|---|---|
| 1,555,199 A | | 9/1925 | Gouirand |
| 2,790,650 A | | 4/1957 | Boschi |
| 2,905,430 A | * | 9/1959 | Deist ........................ 280/6.158 |
| 2,910,305 A | | 10/1959 | Marette et al. |
| 2,948,549 A | * | 8/1960 | Schultz .................. 267/DIG. 1 |
| 2,964,311 A | | 12/1960 | Stelzer |
| 3,083,059 A | | 3/1963 | Biszantz |
| 3,104,114 A | * | 9/1963 | Vogel ....................... 280/5.508 |
| 3,563,270 A | | 2/1971 | Denny |
| 3,933,368 A | * | 1/1976 | Kellett ....................... 267/64.16 |
| 4,281,684 A | | 8/1981 | Broeg .................... 137/625.21 |
| 4,756,548 A | | 7/1988 | Kaltenthaler et al. |
| 4,809,957 A | | 3/1989 | Schonfeld |
| 4,964,433 A | | 10/1990 | Marietta ....................... 137/115 |
| 4,974,861 A | | 12/1990 | Itoh et al. |
| 4,976,104 A | | 12/1990 | Morris et al. |
| 5,048,867 A | | 9/1991 | Gradert |
| 5,161,579 A | | 11/1992 | Anderson, Jr. |

(Continued)

FOREIGN PATENT DOCUMENTS

DE  3045690 A1  12/1908

(Continued)

OTHER PUBLICATIONS

Communication pursuant to Article 96(2) EPC, dated Nov. 24, 2003 for Application No. 00 959 363.3-2421.

(Continued)

*Primary Examiner*—Thomas Williams
(74) *Attorney, Agent, or Firm*—St. Onge Steward Johnston & Reens LLC

(57) ABSTRACT

A height control valve for use in a vehicle suspension system for controlling the ride height of the trailer, the height control valve provided with a universal mounting for allowing greater flexibility in the mounting of the height control valve to a vehicle frame, the height control valve also having a position indicator to aide an installer in aligning a valve element contained within the valve according to a selected mounting position.

18 Claims, 31 Drawing Sheets

U.S. PATENT DOCUMENTS

| | | |
|---|---|---|
| 5,161,817 A | 11/1992 | Daum |
| 5,211,449 A | 5/1993 | Amtsfeld |
| 5,375,819 A | 12/1994 | Galazin et al. |
| 5,472,227 A | 12/1995 | Schönfeld |
| 5,499,845 A | 3/1996 | Geiger et al. |
| 5,560,591 A | 10/1996 | Trudeau et al. |
| 5,651,555 A | 7/1997 | O'Reilly et al. |
| 5,787,932 A | 8/1998 | Pierce ..................... 137/627.5 |
| 5,860,450 A | 1/1999 | Trudeau et al. |
| 5,934,320 A * | 8/1999 | O'Reilly et al. ............ 251/208 |
| 6,089,551 A | 7/2000 | Haviland et al. |
| 6,202,992 B1 * | 3/2001 | O'Reilly et al. ......... 267/64.18 |
| 6,308,963 B1 | 10/2001 | Lee ........................ 280/5.514 |
| D499,173 S * | 11/2004 | Plath ........................ D23/245 |
| 6,945,275 B2 * | 9/2005 | Krechmery et al. ... 137/625.21 |
| 7,028,996 B2 * | 4/2006 | Plath ....................... 267/64.17 |

FOREIGN PATENT DOCUMENTS

| | | |
|---|---|---|
| DE | 1144125 | 2/1963 |
| EP | 0 556 086 | 8/1993 |
| FR | 2 483 337 | 12/1981 |
| FR | 2 687 350 | 8/1993 |
| GB | 2 312 656 | 11/1997 |
| JP | 58110309 A * | 6/1983 |
| JP | 61215110 A * | 9/1986 |
| WO | WO 95/09093 | 4/1995 |
| WO | WO 95/29823 | 11/1995 |

OTHER PUBLICATIONS

European Search Report, Oct. 13, 2006, 3 pages.

* cited by examiner

HEIGHT CONTROL VALVE WITH UNIVERSAL MOUNTING FOR A SUSPENSION SYSTEM

PRIORITY DOCUMENTS

This application claims the benefit of the filing date of U.S. patent application Ser. No. 10/214,036 filed Aug. 7, 2002.

FIELD OF THE INVENTION

The invention relates to a trailing arm suspension for a vehicle, and more particularly to a mounting arrangement of a height control valve for controlling the ride height of the suspension relative to the vehicle.

BACKGROUND OF THE INVENTION

Trailing arm suspensions for trucks are well known and are commonly used in heavy-duty vehicles, such as semi-tractor/trailer configurations. A trailing arm suspension typically comprises opposing trailing arm assemblies mounted on opposite sides of the vehicle, preferable the vehicle frame rails. Each of the trailing arm assemblies includes a trailing arm having one end pivotally connected to a hanger bracket suspended from the frame rail. The other end of the trailing arm mounts to an air spring, which is affixed to the frame rail. The air spring dampens the pivotal rotation of the trailing arm about the hanger bracket relative to the frame rail.

An axle assembly typically spans and mounts to, or is carried by, the trailing arms. The axle assembly supports the truck wheels. Any bouncing type movement of the wheels when they encounter a bump in the road causes a rotation of the trailing arms and this rotation is then dampened by the air springs.

The air springs typically comprise an air bag from which pressurized fluid can be introduced or exhausted to adjust the degree of dampening provided by the air spring. Additionally, the volume of air in the air spring can be adjusted to alter the height of the frame rails and thus the trailer relative to the trailing arms. Often there is a preferred ride height for the trailer and, depending on the load carried by the trailer, the ride height can vary. Pressurized air is introduced to or exhausted from the air bags to adjust the relative height of the trailer frame rail with respect to the trailing arms for a particular load.

The adjustment of the ride height is traditionally accomplished by a height control valve having an inlet port, and air spring port, and an exhaust port. The inlet port is coupled to the pressurized air system of the vehicle. The air spring port is coupled to the air bags of the air springs and the exhaust port is coupled to the atmosphere. By means of the height control valve, the air spring port may selectively be in fluid communication with either the inlet port or the exhaust port to introduce or exhaust pressurized air from the air springs. A three-position valve is typically used to provide for the fluid connections necessary to introduce and exhaust pressurized air form the air bags. The housing is typically mounted to the vehicle or vehicle frame and the lever arm is typically mounted to the trailing arm, where any movement of the lever relative to the valve housing is indicative of the relative change in position between the trailing arm and the vehicle.

The various height control valves currently available can be operated on a time delay or can respond instantly to changes in height. The valve structure for these valves typically includes multiple spring biased pistons or similar elements that seal the various ports in response to the relative movement of the trailing arm. In addition, the valve structures typically are limited to a single valve position with valves being designated for right-hand or left-hand mounting to the vehicle frame. Examples of this type of height control valve a disclosed in U.S. Pat. Nos. 5,161,579; 5,375,819; and 5,560,591. These valves tend to use a seal in the form of an O-ring or the like that surrounds the dynamic or moving piston to seal the piston relative to the valve housing. These dynamic seals are subject to wear as the piston reciprocates, leading to their eventual failure. In addition, the length of the housing in the piston direction is generally much longer than the width of the housing transverse to the piston direction. As a result, the mounting of the valve is dictated by space limitations of the vehicle.

Outside the context of a height control valve and in the context of a seat adjustment valve, it is known to use a shear valve structure to fluidly connect a pressurized air inlet port to an air cylinder or connect the air cylinder to atmosphere to extend or retract the air cylinder to raise and lower a vehicle seat. The shear valve comprises a chamber that is fluidly connected to the cylinder. A shear valve selectively connects the chamber to either an inlet port or an exhaust port to extend or retract the cylinder. The shear valve comprises a fixed disk positioned within the chamber with an opening connected to the cylinder and openings fluidly connected to the inlet port and the exhaust port. A rotatable disk having a passage that selectively overlies the inlet port opening and the exhaust opening is selectively rotated by the vehicle user to fluidly selectively connect the cylinder port to the inlet port or the exhaust port to extend or retract the cylinder to raise and lower the seat.

Another limitation with current height control valves is that the lever arm cannot be rotated to various positions to facilitate connection to the linkage and at the same time accommodate various mountings for the housing. This type of feature however, would require a method for re-aligning the lever arm so that the height control valve could be properly actuated.

Still another challenge connected with current height control valves is that upon replacement of a worn or damaged valve assembly with a new valve assembly, it is advantageous for the mounting holes of the new valve to match up with the existing mounting holes on the vehicle frame. This again limits the mounting positions for the new valve assembly unless the installer cuts new holes in the vehicle frame, which is highly undesirable.

SUMMARY OF THE INVENTION

Therefore, what is desired is a single height control valve that may be mounted to a vehicle frame in a number of various mounting positions.

It is further desired to provide a single height control valve that may be utilized for both right-hand and left-hand mountings.

It is still further desired to provide a height control valve that where the lever arm can be rotated to various positions.

It is yet further desired to provide a height control valve that provides a simple method for realignment of the lever arm once it has been rotationally displaced.

It is still further desired to provide a single height control valve that may be retrofitted to existing mounting holes while allowing a number of various mounting positions.

The invention relates to a height control valve for controlling the relative height between a vehicle frame and a trailing arm suspension. This is achieved in accordance with one form of the invention by a trailing arm suspension comprising a trailing arm having one end pivotally mounted to the vehicle frame and carrying an axle that rotatably mounts ground engaging wheels. An air spring is positioned between another end of the trailing arm and the vehicle to resist the rotation of the trailing arm relative to the frame. The height control valve according to the invention preferably comprises a housing defining an interior chamber and having an inlet port fluidly connecting to the air spring. Additionally, an exhaust port is provided in the housing for fluidly connecting to the atmosphere. A valve is disposed within the interior chamber and is selectively operable between a fill position, an exhaust position, and a neutral position. In the fill position, the air spring port is fluidly connected to the inlet port to introduce pressurized air from the air source into the spring. In the exhaust position, the air spring port is fluidly connected to the exhaust port to permit the exhaustion of pressurized air from the air spring. In the neutral position, the air spring port is not fluidly connected to either the inlet port or the exhaust port. By moving the valve between the neutral, fill and exhaust positions, it is possible to expand or deflate the air spring and thereby adjust the relative height of the vehicle frame to the trailing arm.

In one aspect, the invention relates to the valve further comprising a rotatable valve element disposed within the interior chamber and fluidly separating the inlet port and the exhaust port. The rotatable valve element has a control passage that selectively fluidly connects the air spring port to the inlet port or outlet port upon the rotation of the rotatable valve element between a fill and exhaust position. The rotatable valve element is preferably biased into sealing abutment relative to the housing by the pressure from the pressurized air.

In another aspect, the invention relates to a modular port structure in which the housing comprises a manifold body defining an air spring chamber to which the air spring port terminates and an inlet chamber from which the inlet port originates in combination with a manifold cover that is removably mounted to the manifold body to enclose the air spring chamber and the inlet chamber. The manifold cover preferably comprises at least one air supply connector for fluidly coupling an air supply to the inlet chamber and at least one air spring connector for fluidly connecting the air spring chamber to the air spring. The manifold cover can further comprise additional accessory connectors for fluidly connecting a vehicle accessory to the air spring chamber.

Preferably, a modular dump valve is mounted between the manifold body and the manifold cover for selectively fluidly connecting the air spring port to the exhaust port to dump the pressurized air from the air springs independent of the position of the height control valve.

In yet another aspect, the invention relates to the height control valve including a lever having one end operably connected to the valve to selectively move the valve between the fill, exhaust, and neutral positions, and other end adapted to be connected to the trailing arm. In this configuration, the rotation of the trailing arm moves the lever to thereby move the valve between the neutral, fill, and exhaust positions. Preferably, in this configuration, the valve comprises a movable valve element and the lever comprises first and second elongated arms. The first arm has one end fixedly coupled to the movable valve element and the second arm has one end adapted to be connected to the trailing arm.

The second arm is rotatably adjustable relative to the first arm to provide for adjusting the height of the lever relative to the trailing arm.

Another aspect of the invention relates to the valve further comprising a moveable valve element having a control passage. The valve is movable between a first position where the control passage fluidly connects the air spring port to the inlet port to place the valve in the fill position, a second position where the control passage fluidly connects the air spring port to the exhaust port to place the valve in the exhaust position, and a third position where the control passage is not in fluid communication with either the inlet port or the exhaust port to place the valve in the neutral position. The control passage presents an increasing cross-sectional area to the air spring port as the valve is moved to either the fill or exhaust positions to provide for an increasing flow rate through the air spring port as a function of the degree of movement of the movable element.

In yet another aspect, the invention relates to a shaft extending through the housing and having a key in combination with the valve further comprising a rotatable valve element having a slot that receives the key of the shaft. A resin is disposed within the slot to fill in any spaces between the key and the slot.

Still further, a height control valve has been provided that may be mounted to a vehicle frame in a number of various mounting positions. In one advantageous embodiment, the housing of the height control valve is provided with multiple mounting members that are spaced apart from each other. The spacing of the mounting members is such that the height control valve may be rotated to various mounting positions while still being able to utilize existing mounting holes in a vehicle frame.

In another advantageous embodiment a position indicator is provided for the height control valve to indicate the position of a valve element situated in an interior chamber of a housing of the height control valve. The position indicator may provide, for instance, a visual indication to an installer the rotational position of the valve element. Once the height control valve is mounted to the vehicle frame, the installer can simply look at the position indicator to align the valve element with the lever arm that is connected to a linkage assembly. In this manner it is simple for the installer to retrofit the height control valve in the mounting position desired to an existing vehicle.

The lever arm typically is coupled to the valve element by means of a shaft. The linear displacement of the lever arm based on a variable distance between the vehicle frame and the trailing arm, is translated into rotational displacement of the valve element in the height control valve. In one advantageous embodiment the lever arm is coupled to the shaft at one end of the lever arm, while the other end of the lever arm may be coupled to a linkage. In another advantageous embodiment, the shaft is connected to a mid point of the lever arm, while either end of the lever arm may be coupled to a linkage providing further versatility in mounting positions.

In one advantageous embodiment a height control valve for controlling the relative height between a vehicle frame and a vehicle suspension, the height control valve selectively operable between a fill, exhaust and neutral position and having a housing is provided comprising a first mounting member located along an edge of the housing for mounting the height control valve to the vehicle frame. The height control valve further comprises a second mounting member located along an edge of the housing for mounting the height control valve to the vehicle frame, the second mounting member being located a distance ($d_1$) from the first mounting member. The height control valve still further comprises a third mounting member located along an edge of the housing for mounting the height control valve to the vehicle frame, the third mounting member being located a distance ($d_2$) from the second mounting member, the distance ($d_1$) being equal to the distance ($d_2$) to facilitate various mounting positions of the height control valve.

In another advantageous embodiment a height control valve for controlling the relative height between a vehicle frame and a vehicle suspension, the height control valve selectively operable between a fill, exhaust and neutral position comprising a housing having at least three mounting members located along an edge of said housing, the housing defining an interior chamber. The height control valve further comprises a valve element located in the interior chamber for selectively operating the height control valve between the fill, exhaust and neutral positions. The height control valve still further comprises a position indicator for the valve element to indicate the rotational position of the valve element so that upon installation of the height control valve in one of a number of various installation positions to the vehicle frame the valve element may be aligned with a lever arm to operate the height control valve between the fill, exhaust and neutral positions.

In still another advantageous embodiment a method for mounting a height control valve to a vehicle frame in one of a number of various mounting positions is provided comprising the steps of positioning a first mounting member to a edge of a housing of the height control valve, and positioning a second mounting member to the edge of the housing a distance ($d_1$) from said first mounting member. The method further comprises the steps of positioning a third mounting member to the edge of the housing a distance ($d_2$) from said second mounting member and selecting the distance ($d_1$) to be equal to the distance ($d_2$). The method still further comprises the steps of providing a position indicator to indicate the rotational position of a valve element located in an interior chamber of the housing, selectively mounting the height control valve to the vehicle frame in one of a number of various mounting positions, and aligning the position indicator with a lever arm to operate the height control valve between a fill, exhaust and neutral position.

The invention and its particular features and advantages will become more apparent from the following detailed description considered with reference to the accompanying drawings.

DETAILED DESCRIPTION OF THE DRAWINGS

Figure 1:
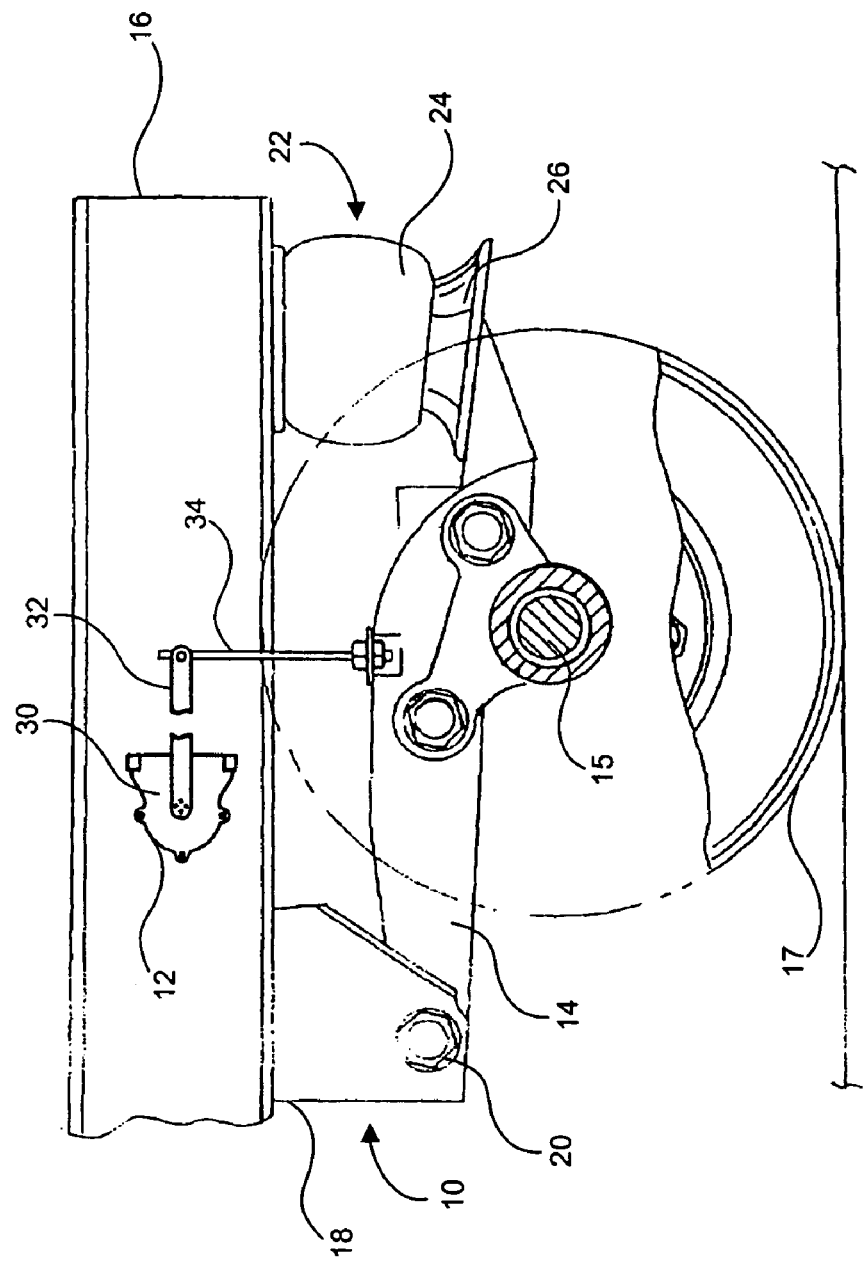
FIG. 1 is an elevational side view of a trailing arm suspension having a height control valve according to the invention.

FIG. 1 illustrates a trailing arm suspension 10 in combination with a height control valve 12 according to the invention. The trailing arm suspension 10 comprises a trailing arm 14 having a first end that is pivotally connected to the vehicle frame 16 through a hanger bracket 18. Preferably, the pivotal connection is an elastomeric bushing 20.

An air spring 22 comprising a lift bag 24 and a piston 26 is positioned between the trailing arm 14 and the frame rail 16. The lift bag 24 is connected to the vehicle frame 16 and the piston 26 is connected to the trailing arm 14. Pressurized air can be introduced or exhausted from the lift bag to control the relative position of the vehicle frame 16 and the trailing arm 14. The lift bag 24 serves to dampen the rotational movement of the trailing arm 14 about the pivotal connection 20 with the vehicle frame.

Referring to FIGS. 1–4, the height control valve 12 according to the invention comprises a housing 30 that is fixedly mounted to the vehicle frame 16 by bolts 31. A lever 32 has one end rotatably mounted to the valve 12 and the other end connected to the trailing arm 14, preferably, by way of an adjustable rod 34 extending from the trailing arm 14 to the lever 32. Movement of the trailing arm 14 about the pivotal connection 20 relative to the frame 16 causes the lever 32 to rotate relative to the valve housing 30.

The housing 30 comprises an interior chamber 36, open on one side, and a shaft sleeve 37 extending from the other side of the housing 30 and connecting with the interior chamber 36. The interior chamber is partially defined by an interior housing side wall 36A and an interior peripheral wall 36B, which extends away from the side wall 36A. A fluid manifold body 41A is integrally formed with the housing 30 and comprises an air supply port 38 and an air spring port 39. The air supply port 38 extends from the manifold body 41A and through the housing 30 to establish fluid communication with the interior chamber 36. At the fluid manifold body 41A, the supply port has an inlet opening 38A with a relatively large rectangular cross section. At the interior chamber, the supply port 38 has an outlet opening 38B with a slot-like cross section in the peripheral wall 36B.

The air spring port 39 in the housing 30 also extends from the manifold body 41A to the housing 30 to establish fluid communication with the interior chamber 36 through the side wall 36A. The air spring port 39 has a relatively large opening or outlet 39B near the manifold body 41A and converges to a relatively small tubular cross section inlet opening 39A that has a transverse component intersecting with the interior chamber side wall 36A.

An exhaust port 40 extends from the exterior of the housing 30 to the shaft sleeve 37. Specifically, the exhaust port extends to an enlarged diameter portion 37A of the shaft sleeve 37. The shaft sleeve effectively forms part of the exhaust port. The air supply port 38 is adapted to fluidly connect a source of pressurized air to the interior chamber 36. The air spring port 39 fluidly connects the interior chamber 36 to the air spring lift bag 24. The exhaust port 40 fluidly connects the chamber 36 via the shaft sleeve 37 to the atmosphere.

A modular manifold cover 41B is mounted to the housing 30 and overlies the manifold body to cover the air supply port 38 and air spring port 39. The manifold cover 41B includes an air supply hose connection 42 that is aligned with and provides fluid communication with the air supply port 38. The manifold cover 41B further includes air spring hose connections 43, 44 that are aligned with and provide fluid communication to the air spring port 39. The air supply hose connection 42 and air spring hose connections 43, 44 are known connectors for easily receiving hose couplings associated with the vehicle air supply and the air springs. A gasket 45 is provided between the manifold cover 41B and the housing 30 to enhance the fluid seal therebetween.

The modular manifold cover 41b provides the height control valve with fluid port modularity not found in prior height control valves. For example, the number and configuration of air supply port connections 42 and air spring hose connections 43, 44 can be altered by merely mounting a different cover 41B to the manifold body 41A. Thus, the height control valve according to the invention can easily be modified to accommodate different types of air supply connections 42 or air spring connections 43, 44. In addition, the number of air supply connections 42 and air spring connections 43, 44 can be altered as desired. Although, in most circumstances, only one air supply connection will be needed. Other types of air connections can be supplied instead of those connections for an air spring. The air connections can supply many different types of vehicle accessories, including anti-creep devices and the like.

Figure 2:
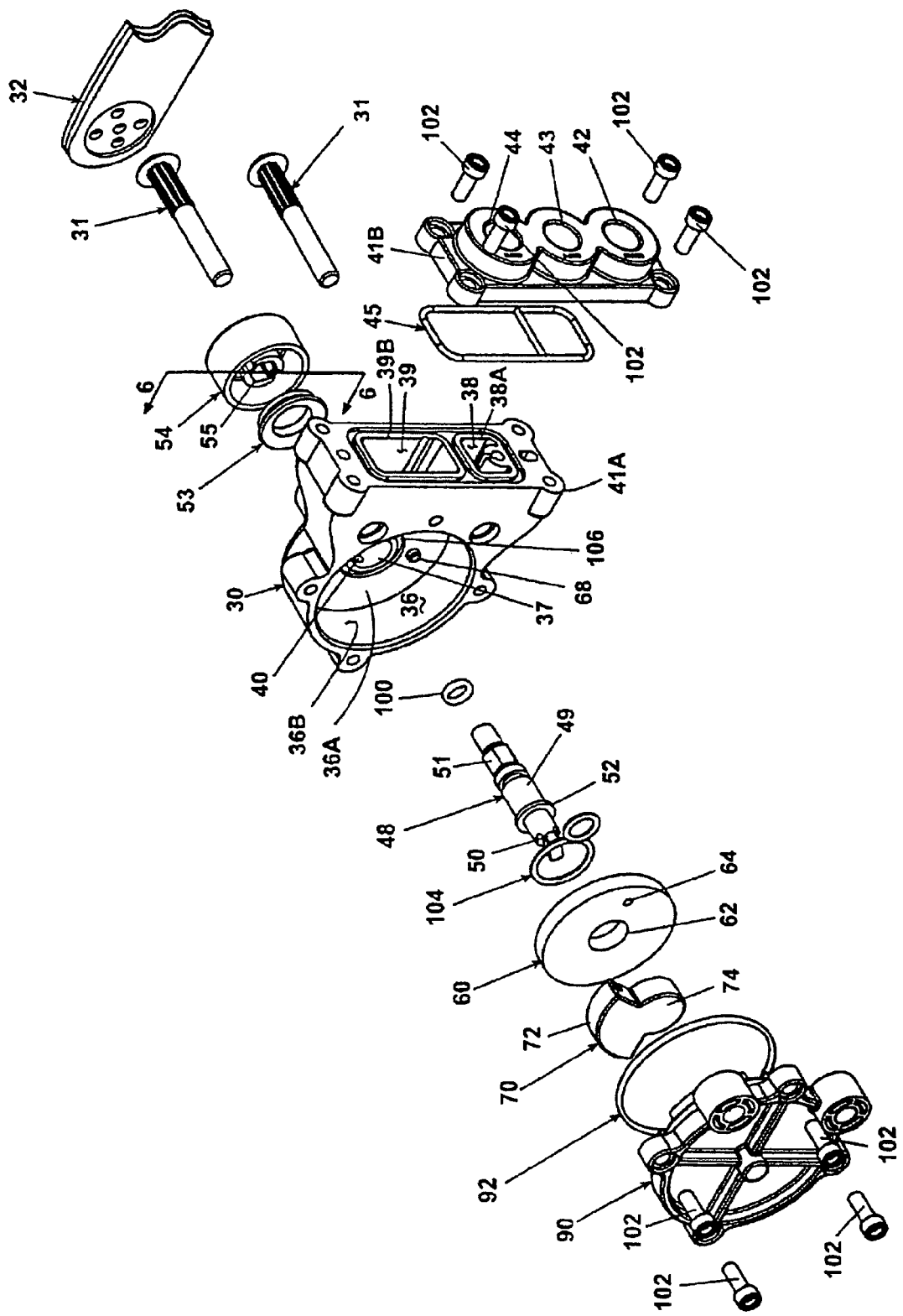
FIG. 2 is an exploded view of the height control valve according to FIG. 1.
Figure 3:
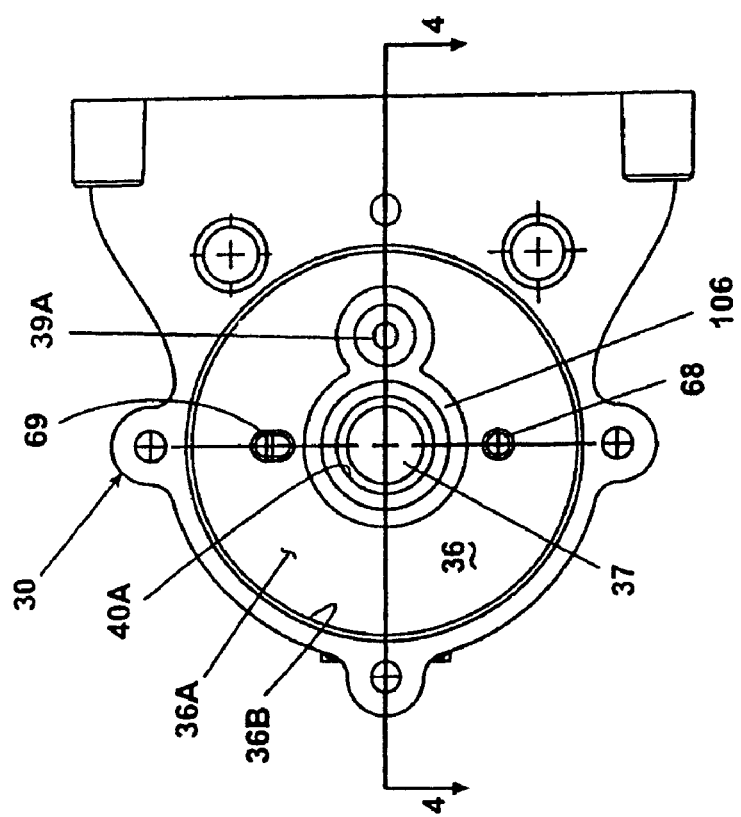
FIG. 3 is an elevational side view of the height control valve housing of FIG. 2.
Figure 4:
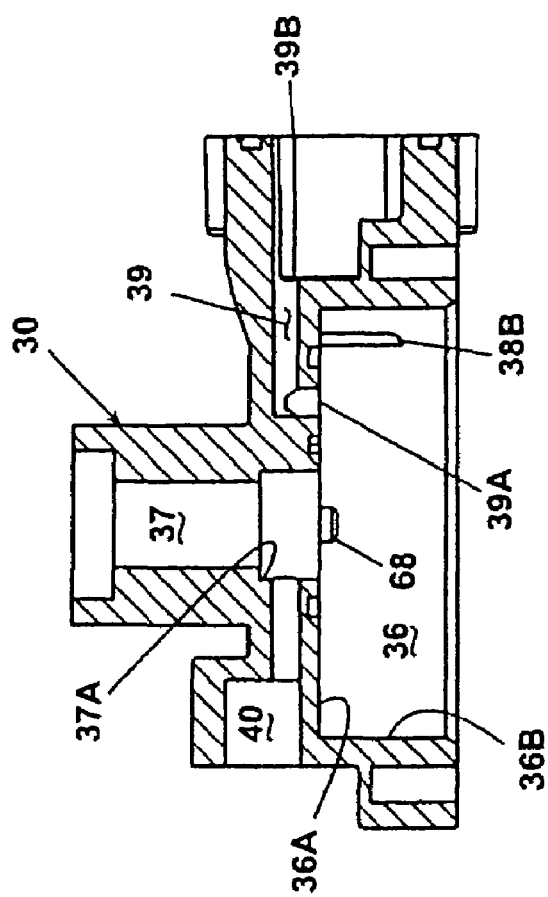
FIG. 4 is a sectional view taken along line 4—4 in FIG. 3.
Figure 5:
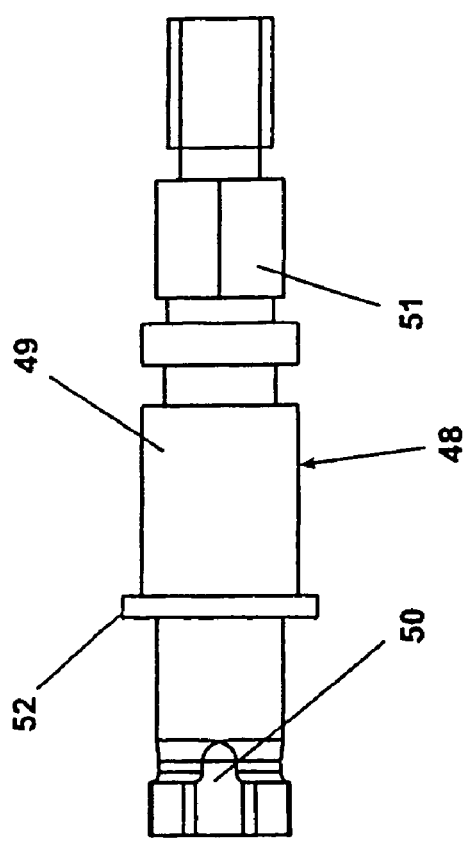
FIG. 5 is a side view of the shaft in the height control valve of FIG. 2.

Referring to FIGS. 2 and 5, a shaft 48 is received within the shaft sleeve 37. The shaft 48 has a large diameter center portion 49 and terminates in a key 50 on one end and carries an adjustable hex head 51 toward the other end. A stop collar 52 is positioned between the keyed end 50 and hex head 51. The rounded central portion is sufficiently sized to at least partially fluidly seal the shaft with respect to the shaft sleeve 37, but not with respect to the enlarged diameter portion 37A. An O-ring 100 is provided to enhance the seal of the shaft relative to the housing. A handle seal 53 and handle cap 54 are provided to seal the shaft sleeve 37 at the exterior side of the housing 30 and provide a mating surface for the handle 32.

Figure 6:
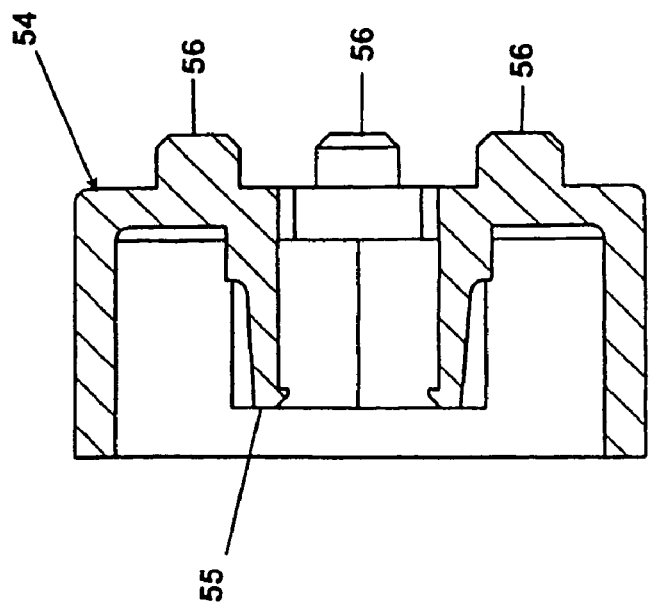
FIG. 6 is a sectional view taken along line 6—6 in FIG. 2.

Referring to FIGS. 2 and 6, the cap 54 includes a hexagonal shaft collar 55 that is sized to receive the adjustable hex head 51. The handle is fixedly mounted to the portion of the shaft adjacent the hex head 51. Multiple mounting studs 56 extend from the handle cap 54.

Figure 6A:
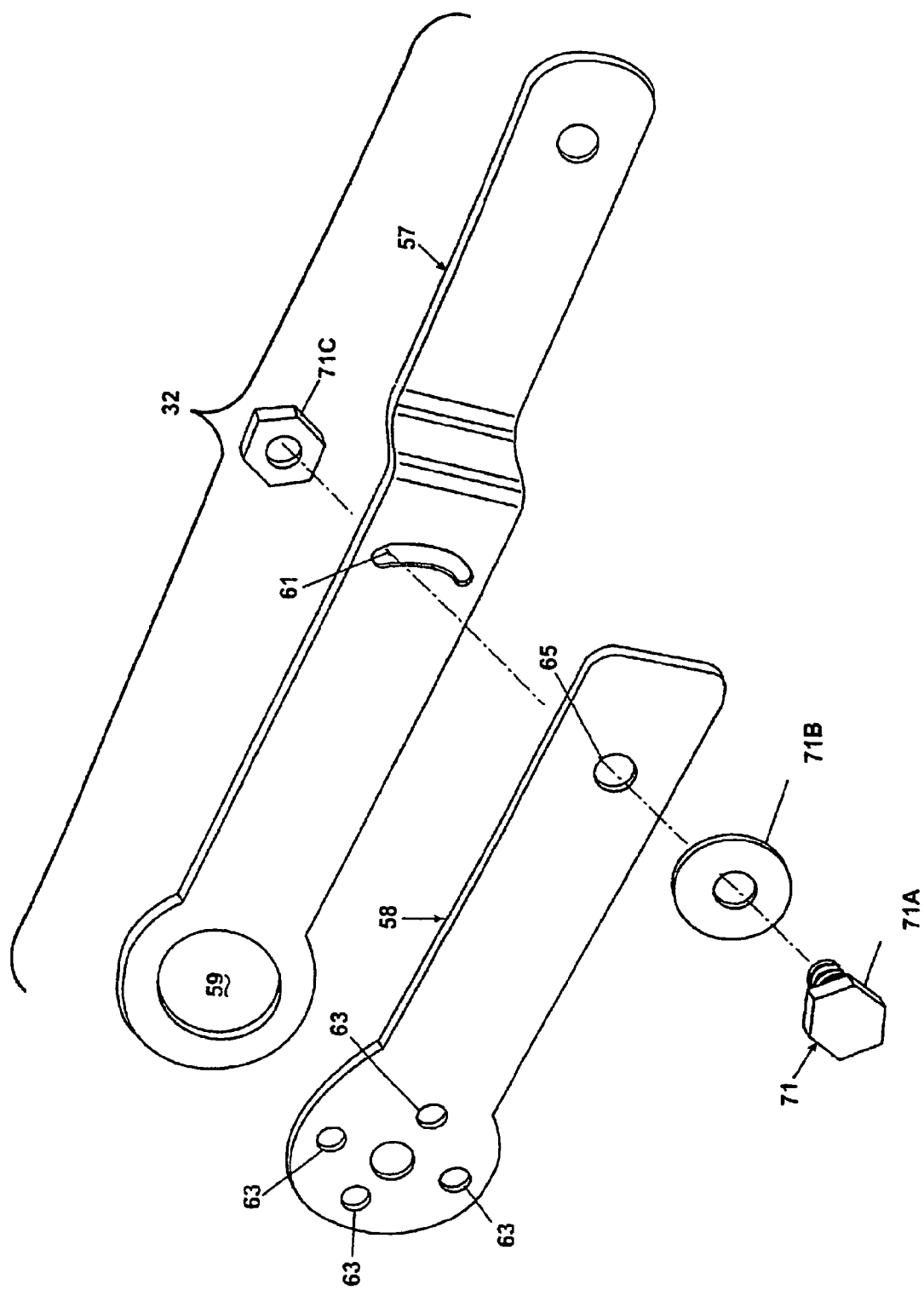
FIG. 6A is a perspective view of a multiple-arm lever for the height control valve of FIG. 2.

Referring to FIGS. 2 and 6A, the handle 32 comprises an inner arm 57 and an outer arm 58, which together function as the entire arm or lever for the height control valve. The inner arm 57 has one end in which is formed a handle cap opening 59 whose diameter is sufficiently large enough to circumscribe the multiple mounting studs 56 extending from the handle cap 54. The handle cap opening 59 permits the inner arm 57 to be mounted to the handle cap 54 and rotate relative thereto. The inner arm 57 further includes an arcuate slot 61, whose radius of curvature originates at the center line for the handle cap opening 59. The outer arm 58 comprises multiple openings 63 located at one end thereof and which correspond in size and spacing to the multiple mounting studs 56 of the handle cap 54. A bolt hole 65 is located at the opposite end of the outer arm 58 than the openings 63 and is sized to receive a traditional fastener assembly 71 comprising a bolt 71A, washer 71B, and a nut 71C.

The dual arm construction of the lever 32 permits the lever 32 to be rotationally adjusted relative to the shaft 48. The rotational adjustment is achieved by the inner arm 57 being mounted to the handle cap 54 by positioning the mounting studs 56 within the interior of the handle cap opening 59. Since the handle cap opening 59 circumscribes the mounting studs 56, the inner arm 57 is free to rotate relative to the handle cap 54. The outer arm 58 is mounted to the handle cap 54 such that the mounting studs 56 are received within the corresponding opening 63, which collectively fixes the position of the outer arm relative to the handle cap 54 without prohibiting the rotation of the inner arm 57 relative to the handle cap 54. The fastener assembly 61 is then inserted through the bolt hole 65 in the outer arm 58 and through the arcuate slot 61 of the inner arm 57. The fastener assembly 71 effectively limits the rotation of the inner arm 57 relative to the outer arm 58 to the arc formed by the arcuate slot 61. In other words, as long as the fastener 67 extends through the bolt hole 65 in the outer arm in arcuate slot 61 of the inner arm 57, the inner arm 57 is free to rotate relative to the outer arm 58 and the handle cap 54 with a rotational amount equivalent to the sector cut by the arcuate slot 61. With this configuration, the outer end of the inner arm 57 opposite the end with the handle cap opening 59 can be rotated relative to the handle cap 54 and the outer arm 58 by loosening the fastening assembly 71 and rotating the inner arm 57 relative to the outer arm 58 to provide radial adjustment of the inner arm 57 with respect to the outer arm 58 and ultimately with respect to the housing 30.

Preferably, when the inner arm 57 and outer arm 58 are aligned along their longitudinal axes, the inner arm 57 can be adjusted both positively and negatively with respect to the aligned longitudinal axes. Since the aligned longitudinal axes typically coincide with the horizontal axis of the vehicle in a standard mounting, the rotational adjustment of the inner arm relative to the outer arm 58 also includes a corresponding vertical adjustment with respect to the vehicle frame and trailing arm, effectively providing the height control valve with a height adjustment for the lever 32.

Figure 7:
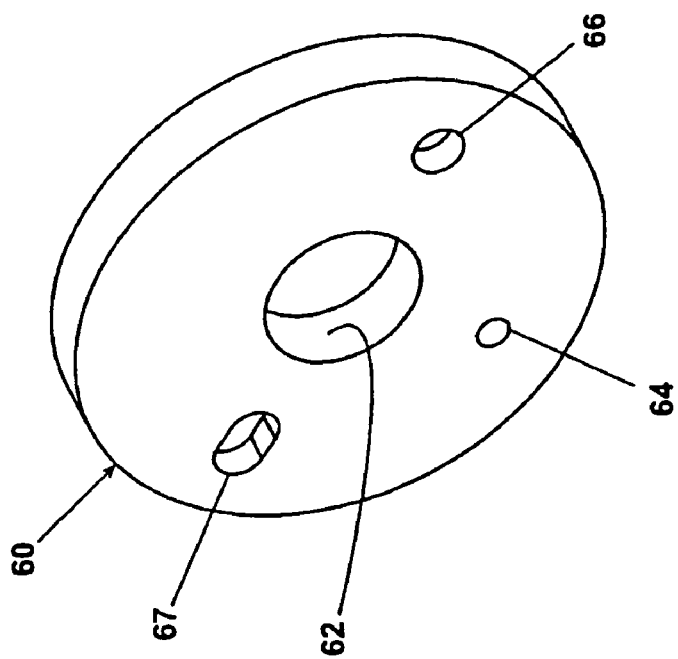
FIG. 7 is an enlarged perspective view of the static shear disk shown in FIG. 2.

Referring to FIGS. 2 and 7, the height control valve further comprises a static car disk 60 having an axial passage in the form of an opening 62 and a fluid passage in the form of an orifice 64, both of which extend through the disk 60. The static shear disk 60 includes blind alignment openings 66 and 67 that receive positioning studs 68 and 69 extending from the housing 30 into the interior chamber 36 to align the static shear disk 60 relative to the housing 30 so that orifice 64 aligns with the transverse portion of the air spring port 39. The axial opening is sized slightly larger than the shaft 48 to ensure that fluid can flow between the shaft and the opening 62 and communicate with the outlet port 40.

Figure 8:
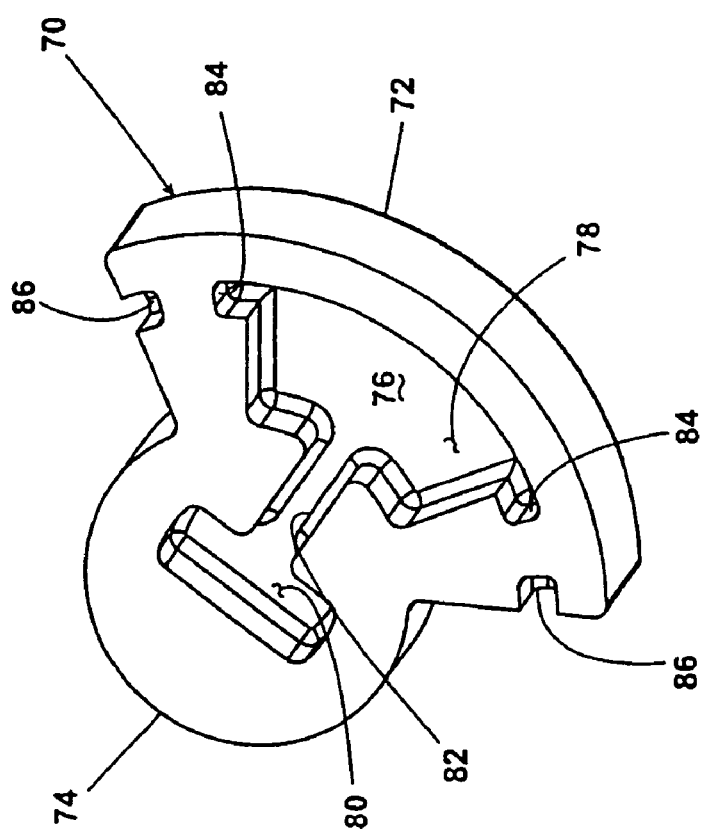
FIG. 8 is an enlarged perspective view of the opposite side of the dynamic shear disk shown in FIG. 2.

Referring to FIGS. 2 and 8, a dynamic shear disk 70 is positioned within the interior chamber 36 of the valve housing 30 in abutting relationship with the static shear disk 60. The dynamic shear disk 70 comprises a sector portion 72 from which extends as a circular lobe 74. A passage in the form of a generally I-shaped recess 76 is formed in the dynamic shear disk 70 and comprises an arcuate portion 78 and a slot portion 80, which are connected by a channel 82. The arcuate portion 78 is predominantly located in the sector portion 72 and includes opposing outlet profile slots 84. An inlet profile slot 86 is provided on the exterior side of the sector portion 72 and corresponds with one of the outlet profile slots 84.

When assembled, the orifice 64 of the shear disk 60 will lie between one of the pairs of outlet profile slots 84 and inlet profile slots 86. The key slot 80 is sized to slidably receive the key 50 on the shaft 48. The connecting slot fluidly connects the key slot 80 to the arcuate portion 78.

Preferably, a suitable resin, such as an epoxy, is disposed within the key slot 80 to fill in any gaps existing between the key 50 and the key slot 80. The resin fill eliminates any play between the key 50 and the key slot 80 so that any rotation of the shaft 48 results in an immediate and corresponding rotation of the dynamic disk 70, which improves the responsiveness and consistency of the height control valve.

Figure 8A:
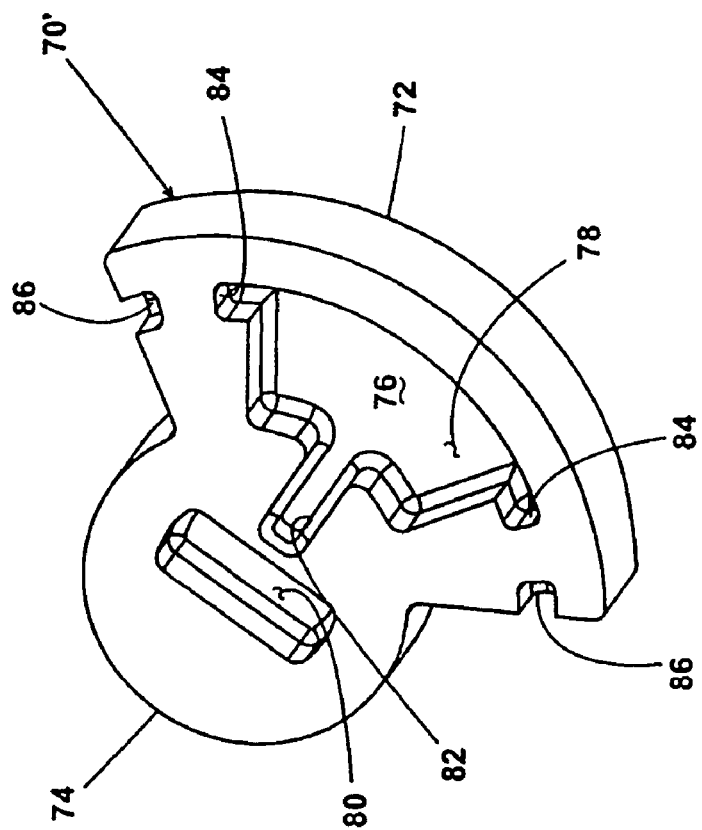
FIG. 8A is an alternative construction of the dynamic shear disk shown in FIG. 8.

FIG. 8A illustrates an alternative construction of the dynamic disk 70. The alternative construction 70 is substantially identical to the dynamic disk 70 except that the connecting channel 82 does not extend into the key slot, but terminates prior to the key slot 80. For the dynamic disk 70 to function properly, it is only necessary that the connecting channel 82 extend a sufficient distance to establish fluid communication with the passage 62 to thereby establish fluid communication between the exhaust port 40 and the recess 76.

Figure 9:
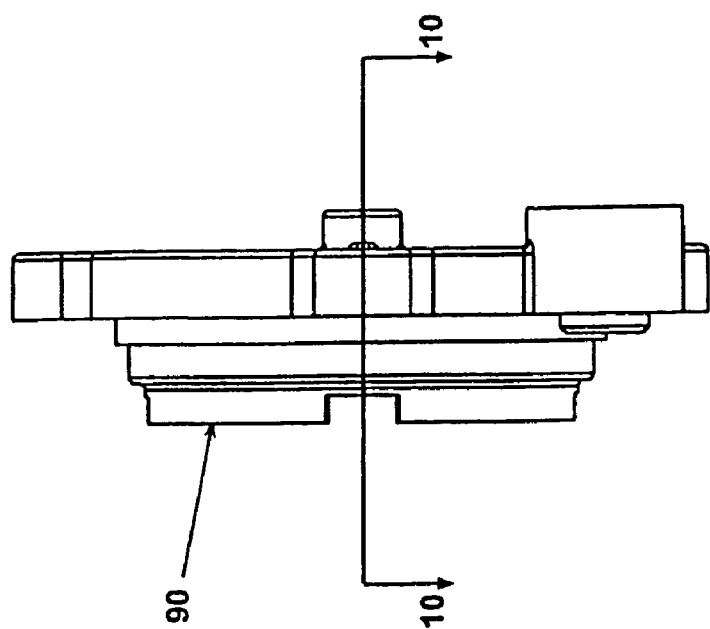
FIG. 9 is a side view of the height control valve cover shown in FIG. 2.
Figure 10:
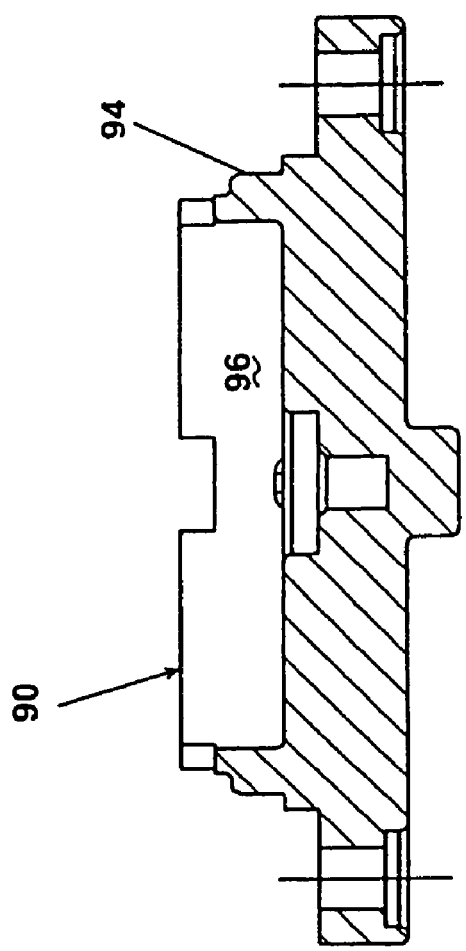
FIG. 10 is a sectional view taken along line 10—10 in FIG. 9.

Referring now to FIGS. 2, 9 and 10, a cover 90 closes the interior chamber 36 of the housing 30 and retains the dynamic shear disk 70 and static shear disk 60 within the housing. An O-ring 92 is provided to enhance the seal between the cover 90 and the housing 30. As best seen in FIGS. 8 and 9, the cover 90 comprises an annular stepped collar 94 that defines an interior recess 96 in which the dynamic shear disk 70 and static shear disk 60 are received. The O-ring 92 is preferably received around the periphery of the step collar 94.

The assembly of the height control valve will now be summarily described. It should be noted that the sequence of many of the steps in the assembly of the height control valve are interchangeable and not important to the invention. The assembly is merely provided for an understanding of the interconnection of the many components of the height control valve. In assembling the height control valve, the shaft 48 is fitted with an O-ring 100 and slidably inserted into the shaft sleeve 37 until the stop collar 52 abuts the interior of the housing 30. The handle seal 53 and handle cap 54 are slidably mounted over the end of the shaft 48 where the hexagonal shaft collar 55 is received over the adjustable hex head 51. The handle 32 is mounted to the handle mount 54 as previously described and is retained with a nut threaded on the end of the shaft.

The manifold cover 41B is affixed to the end of the housing 30 by bolts 102 extending through the manifold cover 41B and threaded into tapped openings in the housing 30. The gasket 45 is positioned between the manifold and the housing 30 prior to affixation of the manifold cover 41B.

Prior to the installation of the static shear disk 60 and dynamic shear disk 70, a tandem O-ring 104 is positioned within a correspondingly shaped groove 106 formed on the interior of the housing 30 and surrounding the shaft sleeve 37 and the transverse portion of the air spring port 39. The static shear disk 60 is positioned within the interior chamber 36 and aligned therein by inserting the alignment stud 68 into the alignment opening 66.

The dynamic shear disk 70 is positioned in the interior chamber 36 and the key 50 of the shaft 48 is received within key slot 80 of the dynamic shear disk 70 to align the dynamic shear disk 70 relative to the shaft 48 and the shear disk 60. The orientation of the dynamic shear disk 70 is adjusted until the orifice 64 lies between one of the pairs of outlet profile slots 84 and inlet profile slots 86 on the dynamic shear disk. In this position, the air spring port 39 is fluidly sealed relative to the air supply port 38 and the exhaust port 40.

The assembly of the height control valve is completed by placing the O-ring 92 on the cover 90 and positioning the cover 90 over the housing and fixing the cover 90 to the housing by threaded bolts 102 that are received within tapped openings in the housing 30.

No O-ring or other type of seal is required between the dynamic disk and the static disk since pressurized air is continually supplied through the inlet port to the portion of the chamber between the cover and the dynamic disk and the pressurized air biases the dynamic disk against the static disk a sufficient amount to seal the disks relative to each other.

The static disk 60 and the dynamic disk 70 are preferably made from ceramic or any other material having suitable wear-resistant characteristics. It is within the scope of the invention for the static disk 60 not to be used and the dynamic disk would directly abut the housing. In such a configuration, the housing is preferably made from a suitable wear-resistant material. No traditional seal, an O-ring or the like, would be required between the dynamic disk and the housing.

The operation of the suspension and the height control valve will be described in the context of the height control valve's three operation positions: fill position, neutral position, and exhaust position. For purposes of this description, it will be assumed that the height control valve begins in the neutral position. In the neutral position shown in FIG. 11, the dynamic shear disk 70 is oriented relative to the shear disk 60 such that the shear disk orifice 64 is positioned between the extension slot 84 and the exterior slot 86 and in abutting relationship with the dynamic shear disk 70, effectively sealing the transverse portion of the air spring port 39 and blocking fluid communication from either the air supply port 38 or exhaust port 40 to the air spring port 39. In the neutral position, the lever 32 is preferably horizontally oriented.

Figure 12:
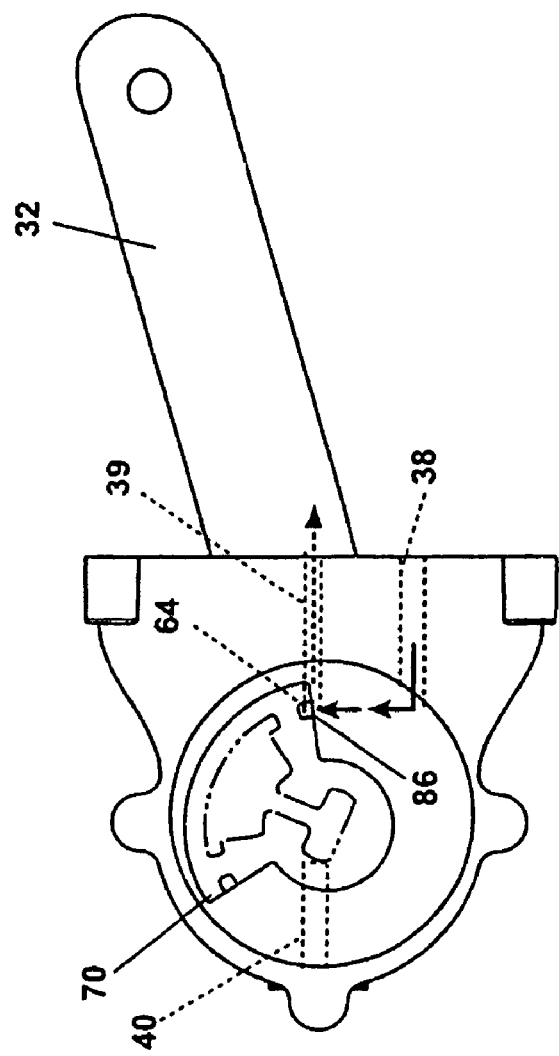
FIG. 12 is a plan view of the height control valve of FIG. 2 shown in a fill position.

If for any reason there is relative movement of the trailing arm 14 towards the frame rail 16, such as an increase in the loading of the trailer, the lever 32 will rotate upwardly in FIG. 12 thereby rotating the shaft 48 and ultimately the dynamic shear disk 70 that the orifice 64 moves into fluid communication with the exterior slot 86 to open the air spring port 39 to the interior chamber 36. Since the interior chamber 36 is constantly exposed to the air supply port 38, pressurized air will be directed into the air spring port 39 and introduce pressurized air into the air springs. As the air springs are inflated, the frame rail 16 and trailing arm 14 move relatively away from each other, which ultimately rotates the lever 32 and the dynamic shear disk 70 back to the neutral position.

Figure 13:
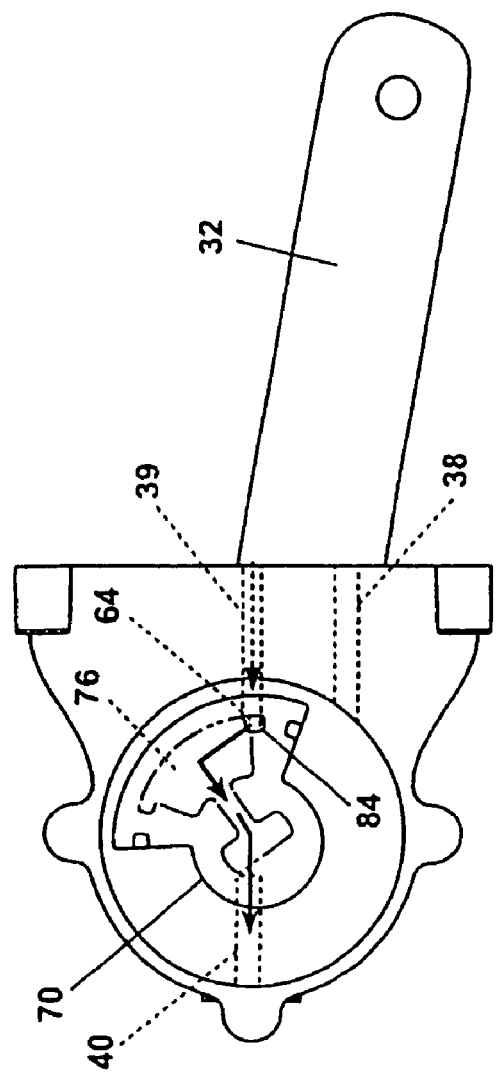
FIG. 13 is a plan view of the height control valve of FIG. 2 shown in an exhaust position.

If the trailing arm 14 and frame rail 16 move away relative to each other, the lever 32 is urged downwardly, as viewed in FIG. 13, moving the dynamic shear disk 70 relative to the shear disk 60, so that the orifice 64 is moved into fluid communication with the recess 76, preferably at an extension slot 84, which is referred to as the exhaust position. In the exhaust position, the air spring port 39 is in fluid communication with the exhaust port 40 through the recess 76. The pressurized air in the air springs is exhausted through the exhaust port 40 to the atmosphere through the recess 76. As the pressurized air is exhausted from the air spring, the trailing arm 14 and the frame rail 16 move relatively towards each, which rotates the lever 32 upward and moves the extension slot 84 toward the orifice 64. The exhausting of the pressurized air from the air springs will continue until the orifice 64 is positioned between the extension slot 84 and the exterior slot 86.

It should be noted that the spacing between the extension slot 84 and the exterior slot 86 is slightly wider than the diameter of the orifice 64. Therefore, small relative movements between the trailing arm 14 and the frame rail 16 will not result in the height control valve moving from the neutral position to either of the fill or exhaust positions. This construction is preferred so that slight weight variations or the normal operation of the suspension will not result in an adjustment of the vehicle ride height.

It should also be noted that when assembled, the shaft 48 will extend axially through the opening 62 of the static disk 60 and the key 50 will be received within the key slot 80 on the dynamic disk 70 to thereby axially align the rotational axis of the dynamic disk 70 with the central axis of the static disk 60. In this position, the connecting channel 82 extends over the static disk opening 62 to establish fluid communication between the exhaust port 40 and the profile slots 84 in the arcuate portion 78 of the recess 76.

Figure 14:
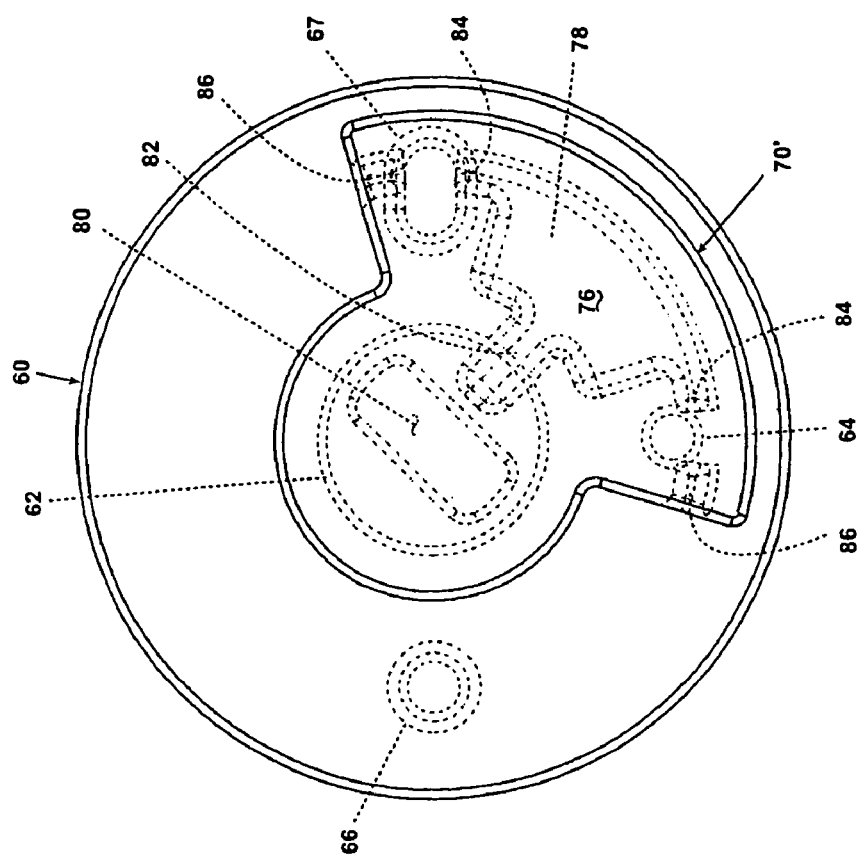
FIG. 14 is an enlarged view of the alternative dynamic disk and the fixed disk in their assembled positions with outlet and inlet profile slots of the dynamic disk and the air spring passage of the fixed disk illustrated in phantom lines.

As best seen in FIG. 14, the outlet profile slots 84 and inlet profiles 86 are radially offset a distance from the rotational axis of the dynamic disk 70 a greater distance than the opening 64 is radially offset from the central axis of the fixed disk 60. A result of the radially offset discrepancy between the outlet and inlet profile slots 84, 86 with respect to the opening 64 is that as the dynamic disk 70 is rotated relative to the fixed disk 60 only a corner portion of the outlet and inlet profile slots 84, 86 will initially overlie the opening 64. Upon continued rotation, a great cross-sectional area of the outlet or inlet profile slots 84, 86 will overlie the opening 64, resulting in an increase in cross-sectional area of the outlet and inlet profile slots 84, 86 overlying the opening 64. The increasing cross-sectional area effectively controls the flow rate of the fluid therethrough.

Figure 15:
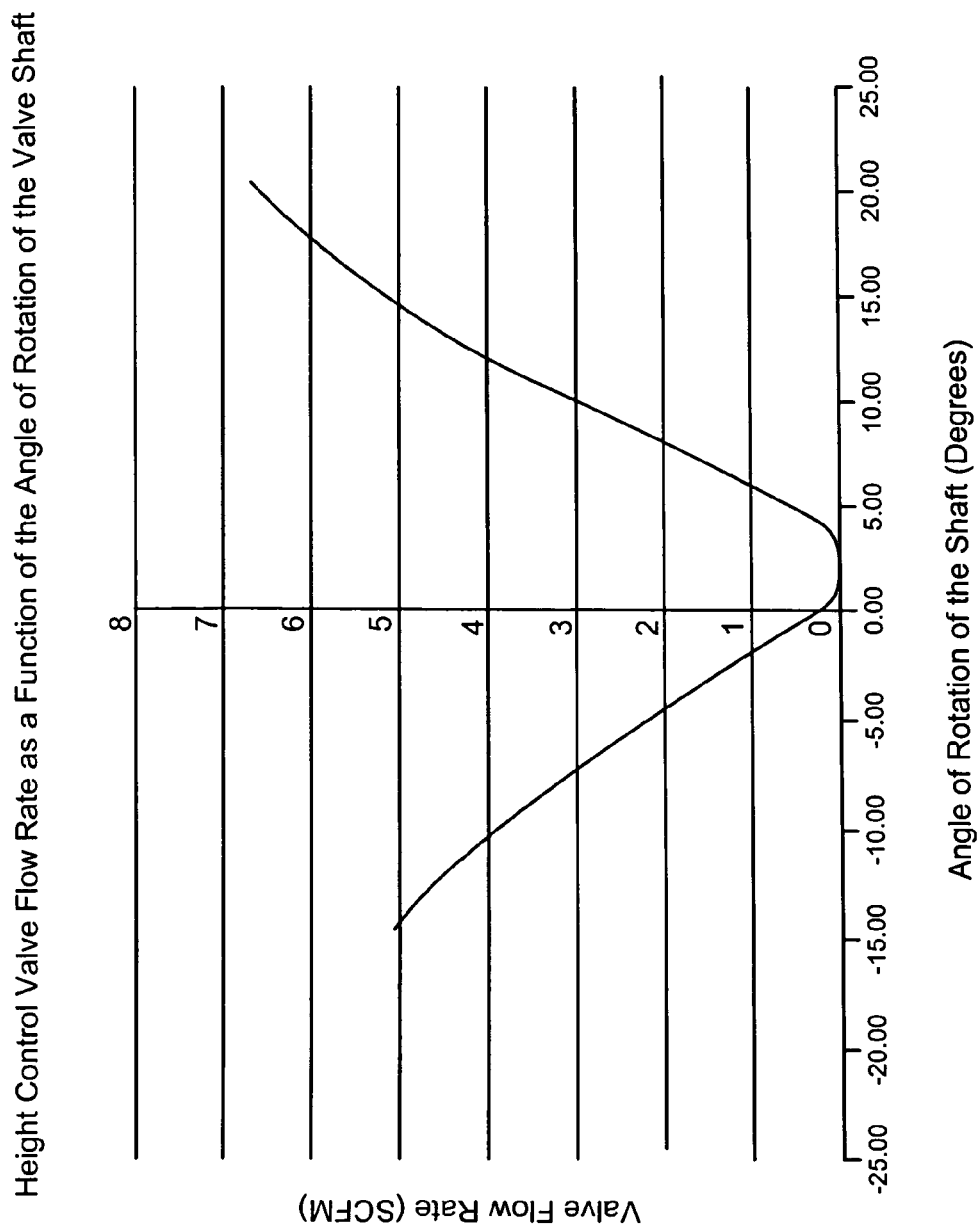
FIG. 15 is a chart illustrating the air flow rate through the air spring passage and the inlet and outlet profile slots at various degrees of rotation of the dynamic disk relative to the fixed disk.

FIG. 15 illustrates a chart showing the increasing flow rate through the aligned outlet and inlet profile slots 84, 86 as a function of the degree of rotation of the dynamic disk 70 relative to the static disk 60. In other words, as the dynamic disk 70 is rotated a greater amount relative to the static disk 60, the greater is the cross-sectional area of either the outlet profile slot 84 or inlet profile slot 86 that overlies the opening 64. The control of the flow rate through the aligned profile slots and opening 64 effectively permits control over the amount of fluid that is either added or deleted from the air springs. This flow rate control permits the height control valve to effectively turn on at a slower rate to prevent overcompensating for smaller changes in the relative heights between the vehicle frame and the trailing arm, which correspond to smaller angular rotations of the dynamic disk 70 relative to the fixed disk 60, while still permitting appropriate response for large scale changes, which are indicated by greater rotational changes.

The proportional flow rate feature of the valve can also be accomplished by varying the shaped of the blind openings or the air spring port in addition to or in place of the radial offset between the blind openings and the air spring port.

Figure 16:
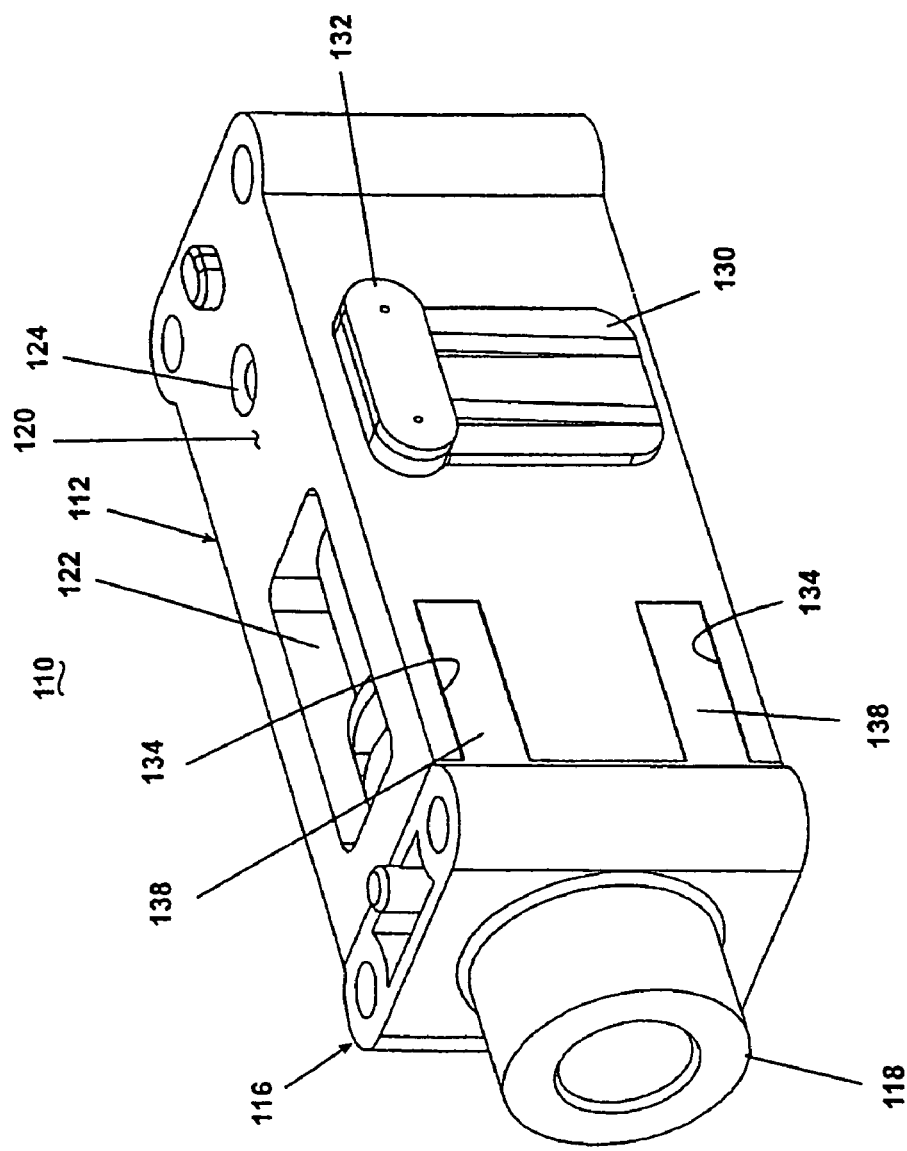
FIG. 16 is a perspective view of a modular dump valve for use with the height control valve according to one advantageous embodiment of the invention.
Figure 17:
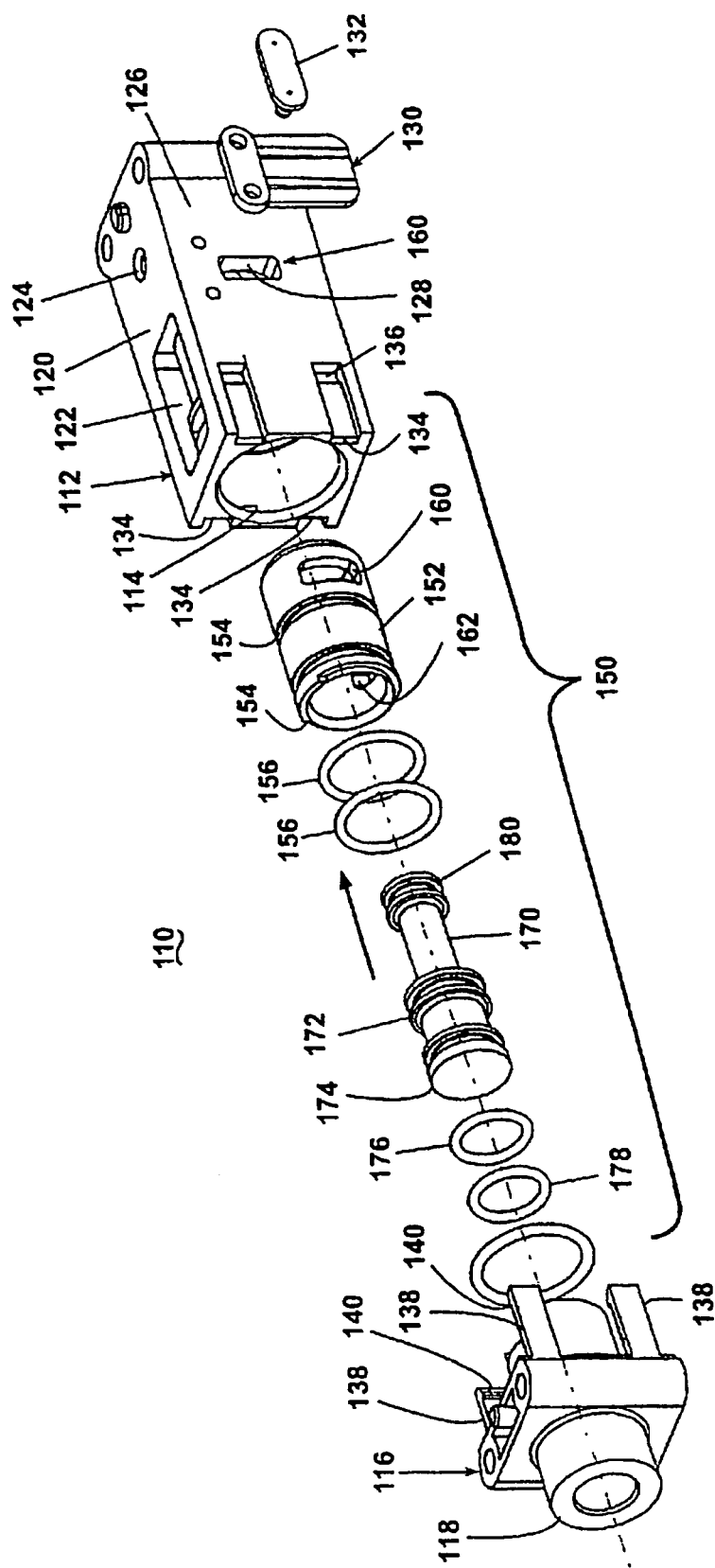
FIG. 17 is an exploded view of a dump valve of FIG. 16.

FIGS. 16 and 17 illustrate a dump valve 110 that is particularly well suited for the port modularity functionality of the height control valve according to the invention. The dump valve 110 comprises a housing formed of a body 112 that defines an interior chamber 114, which is closed by a top 116 that incorporates a fluid connector 118. The dump valve body 112 has a manifold body surface 120 in which is formed an air spring opening 122 and an air supply opening 124 An air spring connector opening (not show) corresponding to the air spring opening is provided on the opposite side of the body and fluidly couples to the air spring connector of the cover. An exterior side surface 126 includes an exhaust opening 128 that can be covered by a resilient cover 130 which is secured to the side surface 126 by a fastener 132.

The end of the dump valve body 112 includes four channels 134, each of 10 which includes a detent 136. The cover 116 includes fingers 138 that correspond to the channels 134. Each of the fingers 138 include a finger 140 that is received within the detent 136 when the cover is snap-fitted to the body.

A valve 150 is disposed within the dump valve body 112 and control fluid communication from the air spring port 122 to either the corresponding air spring connector port or the exhaust port 128. The valve comprises a cartridge 152 having annular grooves 154 and in which are received corresponding O-rings 156, which seal the cartridge 152 relative to the interior of the dump valve body 122 when the cartridge is inserted into the opening 114. An exhaust passage 160 is formed in a sidewall of the cartridge 152 as is an air spring passage 162. The exhaust passage 160 aligns with the exhaust opening 128 and the air spring passage 162 aligns with a air spring port (not shown) on the opposite side of the dump valve body 122 from the air spring opening 122. An annular rib (not shown) is formed on the interior of the cartridge 152 approximately at the same location of the groove 154.

A spool 170 controls the fluid communication between the air spring opening 122 and the air spring passage 162 and exhaust passage 160. The spool 170 comprises adjacent pairs of annular flanges 172 and 174, which receive O-rings 176 and 178, respectively. A spring (not shown) extends from the opposite end of the spool 170. A lower O-ring 180 is provided to seal the lower end of the spool 170.

When the spool 170 is assembled within the cartridge 152 and placed within 30 the dump valve body 112, the O-ring 176 is disposed on the side of the interior rib nearest the exhaust opening 160 and the O-ring 178 is disposed on the side of the interior rib nearest the air spring passage 162. The spring biases the spool 170 such that the O-ring 176 seals against the interior rib and prevents fluid communication between air spring opening 122 and the exhaust passage 160 to thereby prevent the exhaustion through the exhaust opening 128. Upon the manual activation by the user, pressurized air is introduced into the connection 118 on the cover 116 of the dump valve 110. The pressurized air bears against the end of the spool and overcomes the force of the spring 180 to move the spool 170 away from the cover 116. As the spool 170 moves away from the cover 116, the O-ring 176 un-seats relative to the interior annular rib and the cartridge 152 and the O-ring 178 passes over the air spring passage 176 and is positioned between the air spring passage 162 and the air spring opening 122 to thereby establish fluid communication from the air spring opening 122, through the interior the cartridge 152, through the exhaust passage 160, where the air can exhaust through the exhaust opening 128 and thereby exhaust all of the pressurized air from the air springs.

As seen in FIG. 17, when assembled, the dump valve 110 has a profile that is substantially identical to the manifold body 41A and the manifold cover 41B. Therefore, the dump valve 110 can be interposed between the manifold body 41A and the cover 41B and provide for a modular dump valve assembly that can be easily added to the height control valve if desired. When the dump valve 110 is not in the dump position, the dump valve 110 maintains fluid communication through the supply connection to the inlet port 38 and the air spring connections 43, 44 through the air supply port 39. An additional advantage of the dump valve 110 is that multiple manifold covers 41B can be used with the dump valve 110 in the same manner as described above with respect to the height control valve alone.

Figure 18:
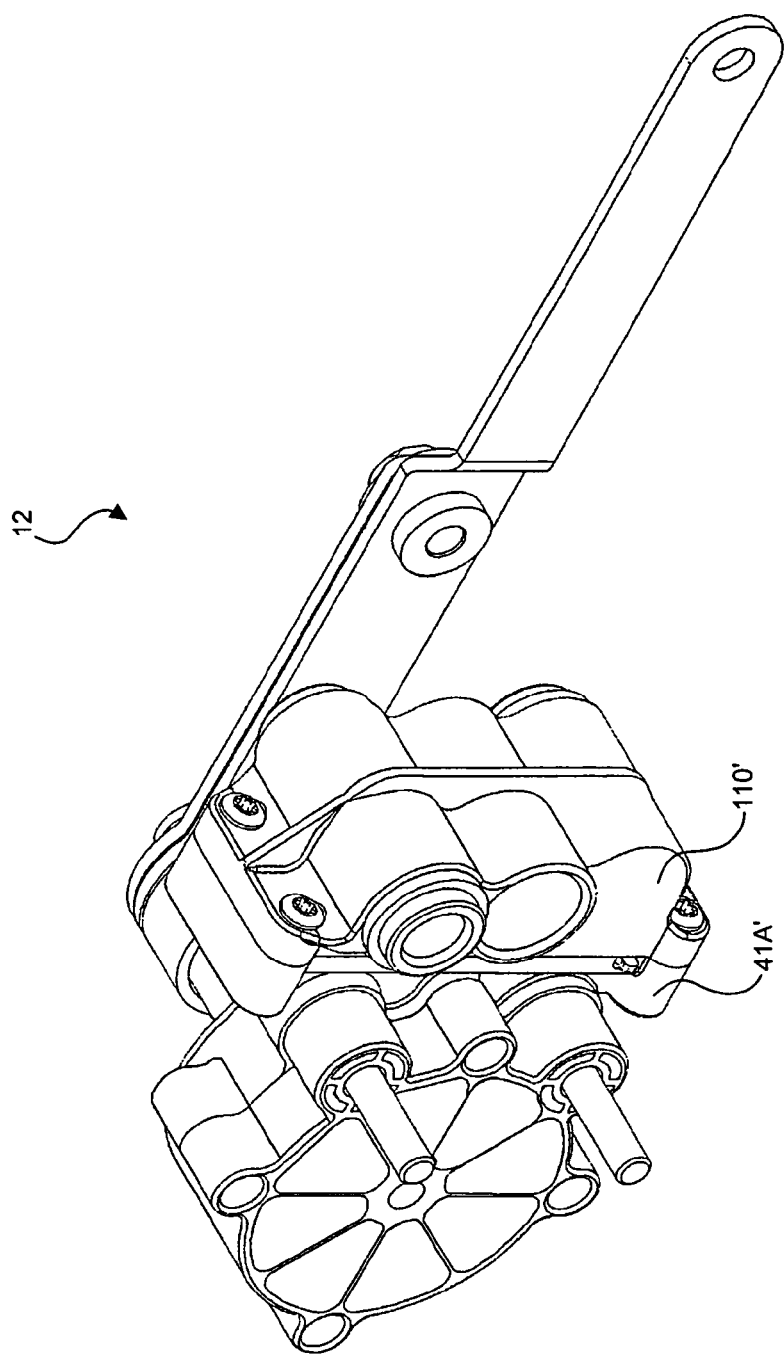
FIG. 18 is a perspective view of the height control valve of FIG. 2 with an attached modular dump valve.

FIG. 18 illustrates yet another advantageous embodiment utilizing a dump valve 110' in connection with manifold body 41A. The operation of dump valve 110' is similar to the operation of dump valve 110 however it is not necessary to utilize cover 41B in this embodiment as dump valve 110' is closed on one end. It is conceived that many differing configurations of the dump valve may be effectively utilized with height control valve 12.

The suspension and height control valve, according to the invention, provide a very simple and effective means for controlling the ride height of a vehicle. Unlike prior height control valves that tended to use relatively complex plunger/piston arrangements within the various ports of the height control valve, the rotating disk structure of the height control valve 12 along with the location of the various ports provides a much simpler construction and uses parts that are not as susceptible to wear and degradation over time.

Figure 19:
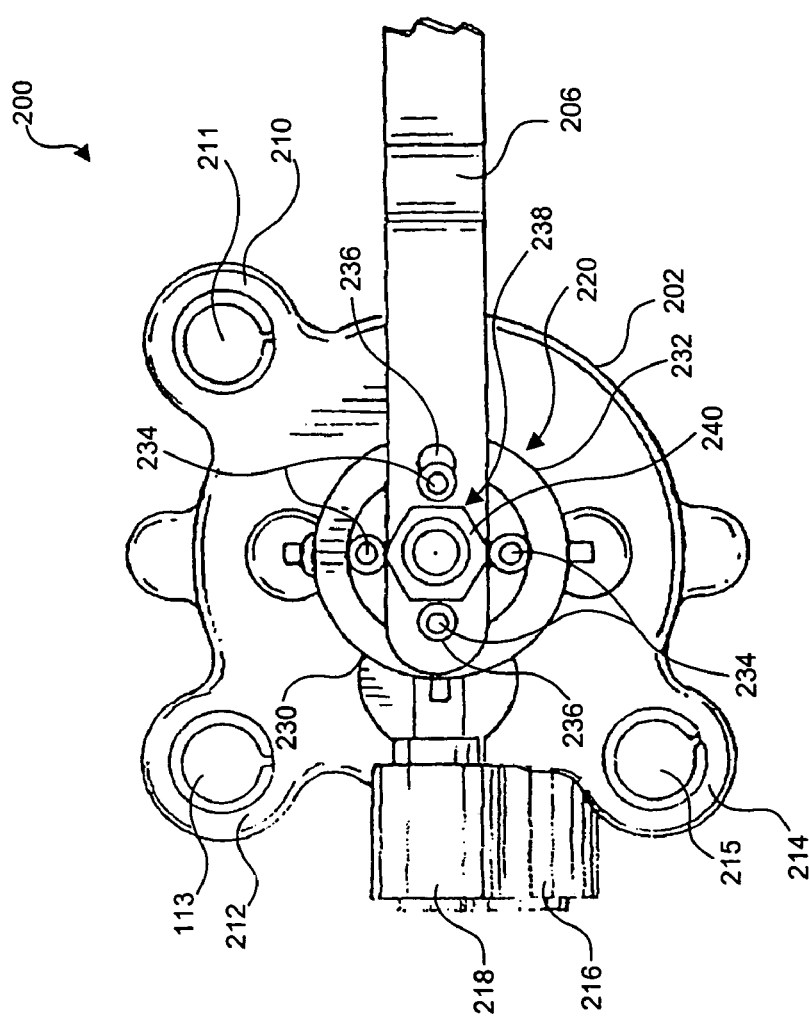
FIG. 19 is a front perspective view illustrating one advantageous embodiment of the height control valve with universal mounting.
Figure 20A:
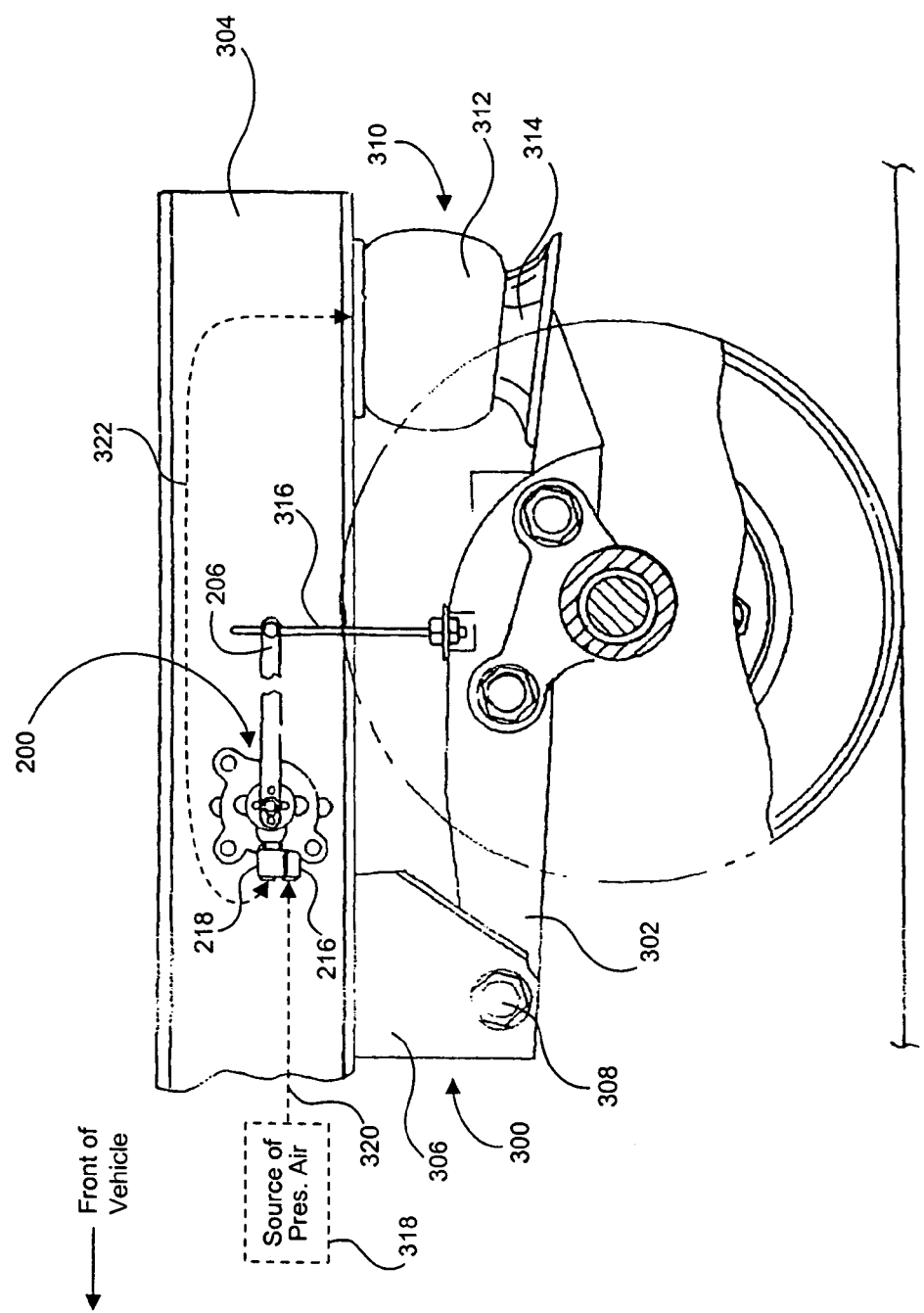
FIG. 20A is a plan view of the height control valve with universal mounting showing a right-hand mounting.
Figure 20B:
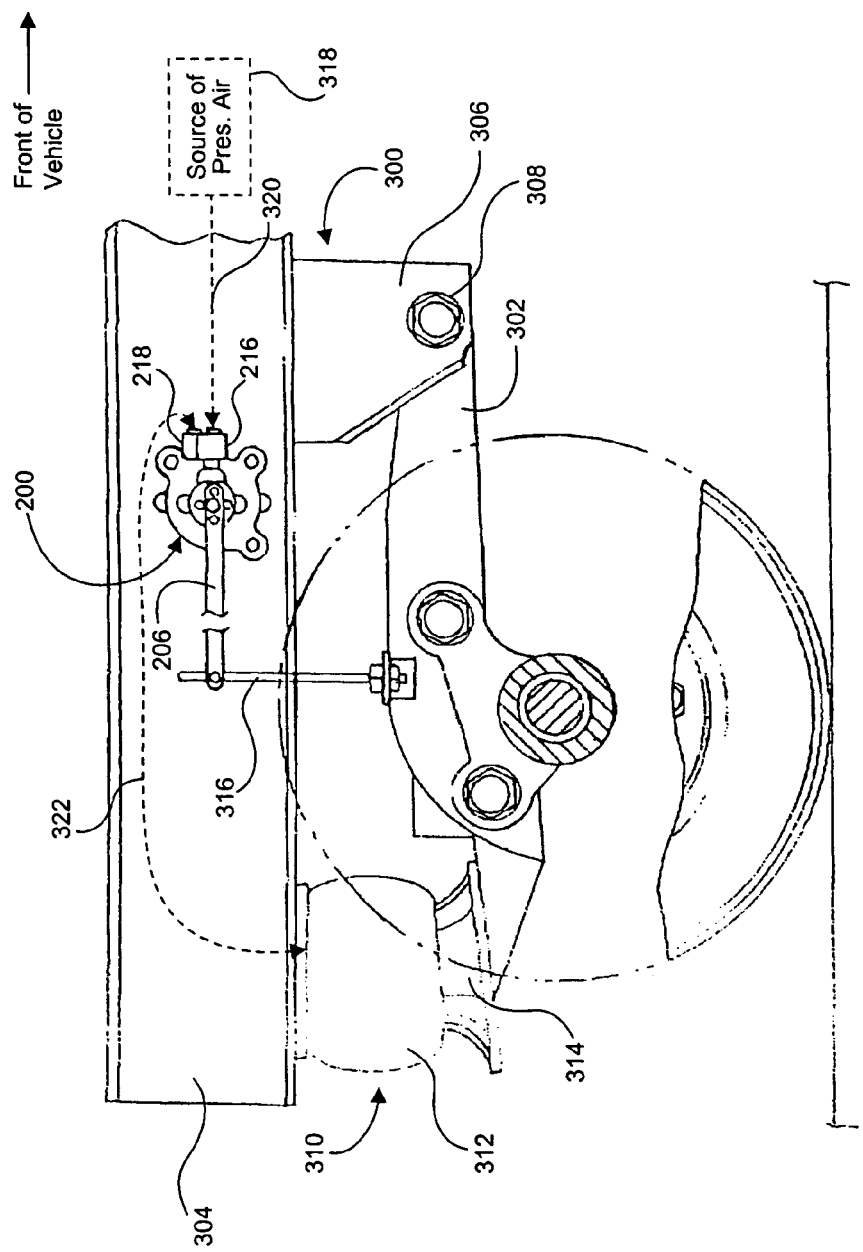
FIG. 20B is a plan view of the height control valve with universal mounting showing a left-hand mounting.

Referring now to FIGS. 19–20B, there is shown another advantageous embodiment of the present invention illustrating height control valve 200. Height control valve 200 comprises a housing 202 that may be fixedly mounted to a vehicle frame 304 by bolts 204. Housing 202 may comprise any suitable material such as a cast metal, rigid plastic or combinations thereof. In one advantageous embodiment, a lever arm 206 has one end rotatably mounted to the height control valve 200 and the other end connected to a trailing arm 302, preferably, by way of an adjustable rod 316 extending from the trailing arm 302 to the lever arm 206. Movement of the trailing arm 302 about the pivotal connection 308 relative to the vehicle frame 304 cause the lever arm 206 to rotate relative to the valve housing 202.

Height control valve 200 also comprises mounting members 210, 212 and 214 for mounting height control valve 200 to vehicle frame 304. Mounting members 210, 212 and 214 are each provided with a hole (211, 213, and 215 respectively) extending therethrough for receipt of a bolt 204.

The housing 202 further comprises an interior chamber 208 an air supply port 216 and an air spring port 218. The air supply port 216 extends through housing 202 to establish fluid communication with the interior chamber 208. The air spring port 218 also extends through housing 202 to establish fluid communication with the interior chamber 208.

Also illustrated in FIG. 19 is a shaft 230 connected to lever arm 206. The shaft 230 is received within a shaft sleeve, similar to that described in connection with FIG. 2, which extends through housing 202. The shaft 230 is connected at one end to lever arm 206 and at the other end to valve element 250 (FIG. 19A–19B). Shaft 230 is sufficiently sized to at least partially fluidly seal shaft 230 with respect to the shaft sleeve. Mounted to shaft 230 is cap 232, which facilitates mounting of lever arm 206 to shaft 230. Cap 232 is provides with a plurality of mounting studs 234, which are designed to coact in part with multiple openings 236 provided in lever arm 206. A hole 238 is provided in lever arm 206 and is designed to fit over an end of shaft 230 onto which a nut 240 is secured to rigidly fasten lever arm 206 to shaft 230.

Although lever arm 206 is illustrated as having two openings 236, it is contemplated that lever arm 206 could be supplied with four openings 236 corresponding to mounting studs 234. It should be noted that lever arm 206 may be mounted to shaft 230 in any one of four mounting positions, each progressive position rotated ninety degrees from the previous position.

An exhaust port 220 extends from the interior chamber 208 of housing 202 through the shaft sleeve to an outlet port similar to that described in connection with FIG. 2. The air supply port 216 is adapted to fluidly connect to a source of pressurized air 218 through a pressurized air line 220 to the interior chamber 208. The air spring port 218 fluidly connects the interior chamber 208 to an air spring lift bag 312 through air spring line 322. The exhaust port fluidly connects the interior chamber 208 via the shaft sleeve to the atmosphere.

FIGS. 20A and 20B illustrate both right-hand and left-hand mountings of height control valve 200 in combination with trailing arm suspension 300. The operation of height control valve 200 is similar to that of height control valve 12 described in connection with FIG. 1.

The trailing arm suspension 300 comprises a trailing arm 302 having a first end that is pivotally connected to the vehicle frame 304 through a hanger bracket 306. In one preferred embodiment, the pivotal connection 308 is an elastomeric bushing.

An air spring 310 comprising a lift bag 312 and a piston 314 is positioned between the trailing arm 302 and the vehicle frame 304. The lift bag 312 is connected to the vehicle frame 304 and the piston 314 is connected to the trailing arm 302. Pressurized air can be introduced or exhausted from the lift bag to control the relative position of the vehicle frame 304 and the trailing arm 302. The lift bag 312 serves to dampen the rotational movement of the trailing arm 302 about the pivotal connection 308 with the vehicle frame.

As can be seen in FIGS. 20A and 20B, height control valve 200 may be mounted in any one of a number of various mounting positions. For instance, in FIG. 20A illustrating a right-hand mounting the height control valve 200 is rotated such that air supply port 216 and air spring port 218 are directed toward the front of the vehicle. Mounting members 212 and 214 may then be utilized to mount height control valve 200 to vehicle frame 304. FIG. 20B illustrates a left-hand mounting of height control valve 200 that is also rotated such that air supply port 216 and air spring port 218 are directed toward the front of the vehicle. Mounting members 212 and 214 may also be utilized to mount height control valve 200 to vehicle frame 304. Although height control valve 200 is illustrated in FIGS. 20A and 20B with air supply port 216 and air spring port 218 directed toward the front of the vehicle, it is contemplated that an installer may just as easily direct the ports upward, downward to toward the rear of the vehicle while still being able to utilize existing mounting means on the vehicle frame 304.

Figure 21:
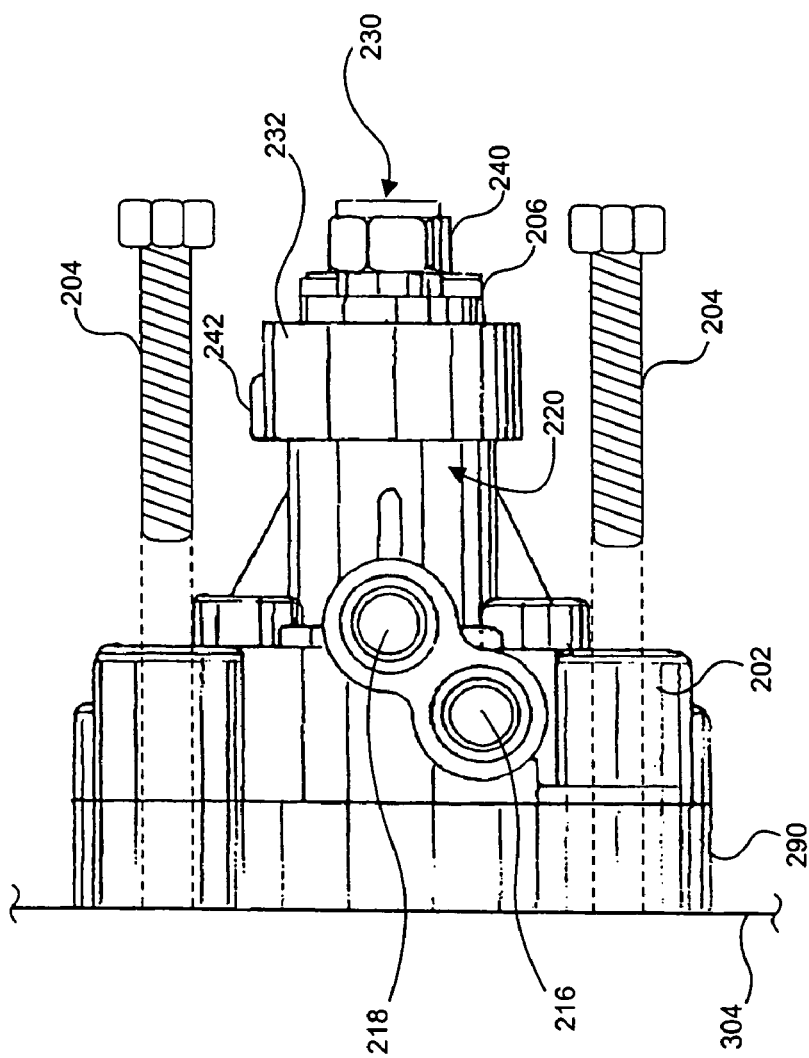
FIG. 21 is a side perspective view of the height control valve with universal mounting.
Figure 22:
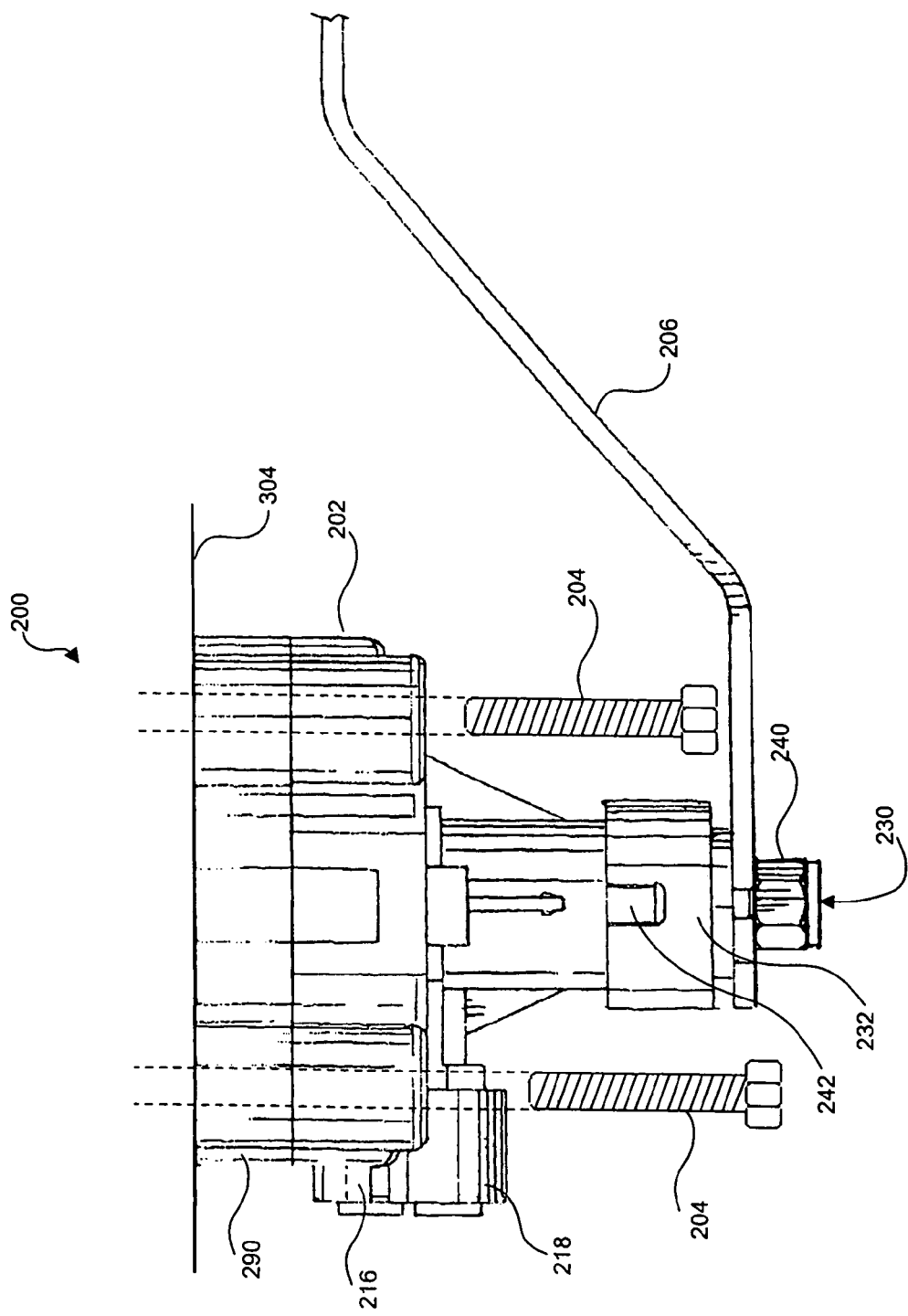
FIG. 22 is another side perspective view of the height control valve with universal mounting.

FIGS. 21 and 22 illustrate height control valve 200 from differing side views. It can be seen that height control valve 200 is securely fastened to vehicle frame 304 by means of bolts 204. Further illustrated is a cover 290 that closes the interior chamber 208 of housing 202 and retains a dynamic shear disk 170 and a static shear disk 160 in housing 202. A seal as previously described in connection with FIG. 2, such as an O-ring, is provided to enhance the seal between the cover 290 and the housing 202. No seal or O-ring is required between dynamic shear disk 270 and static shear disk 260 as previously described herein.

Also illustrated in FIGS. 21 and 22 is position indicator 242, which is located in one advantageous embodiment on cap 232. Position indicator 242 will provide a visual indication to an installer as to the rotational position of the valve element located in the interior chamber 208. Cap 232 may comprise any suitable rigid substance such as, rigid plastic or a non-corroding metal. Position indicator 242 also provides a tactile indication of the valve element such that, if clear visual access to position indicator 242 is obscured as an installer need only feel position indicator 242 in order to align it according to lever arm 206. In addition, while lever arm 206 is shown as a single unit having two bends to form an offset, any shape may effectively be utilized. Further, lever arm 206 may comprise a single or a multi-piece construction as previously described connection with FIG. 6A.

Figure 23A:
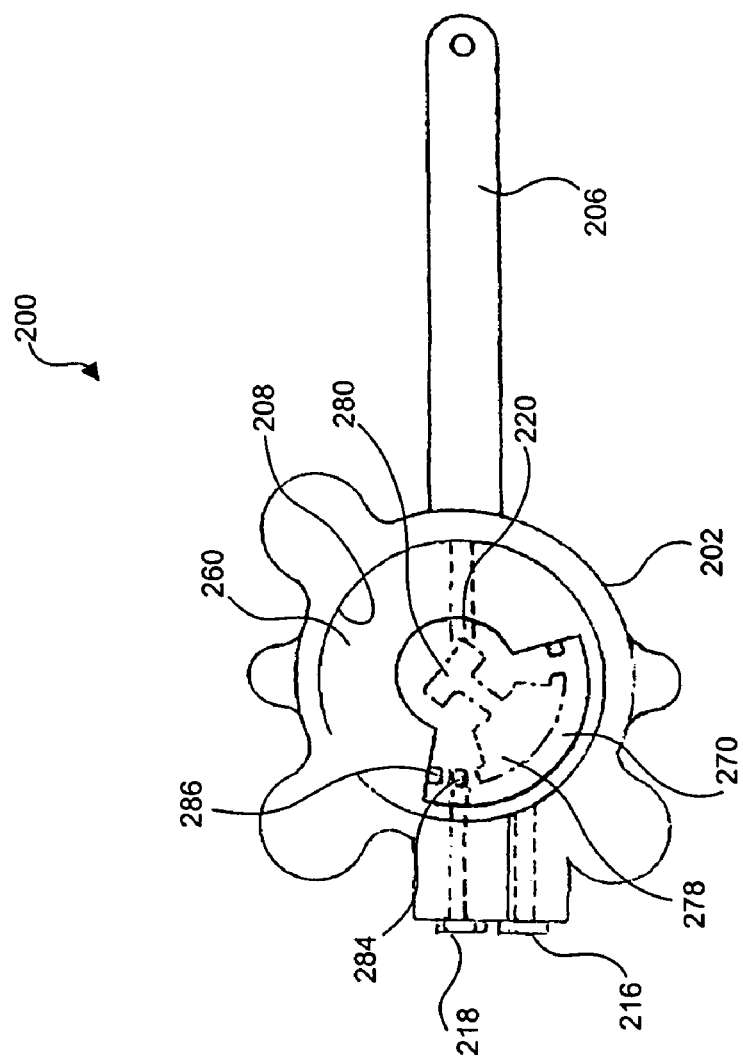
FIG. 23A is a plan view of the height control valve with universal mounting shown in the neutral position.
Figure 23B:
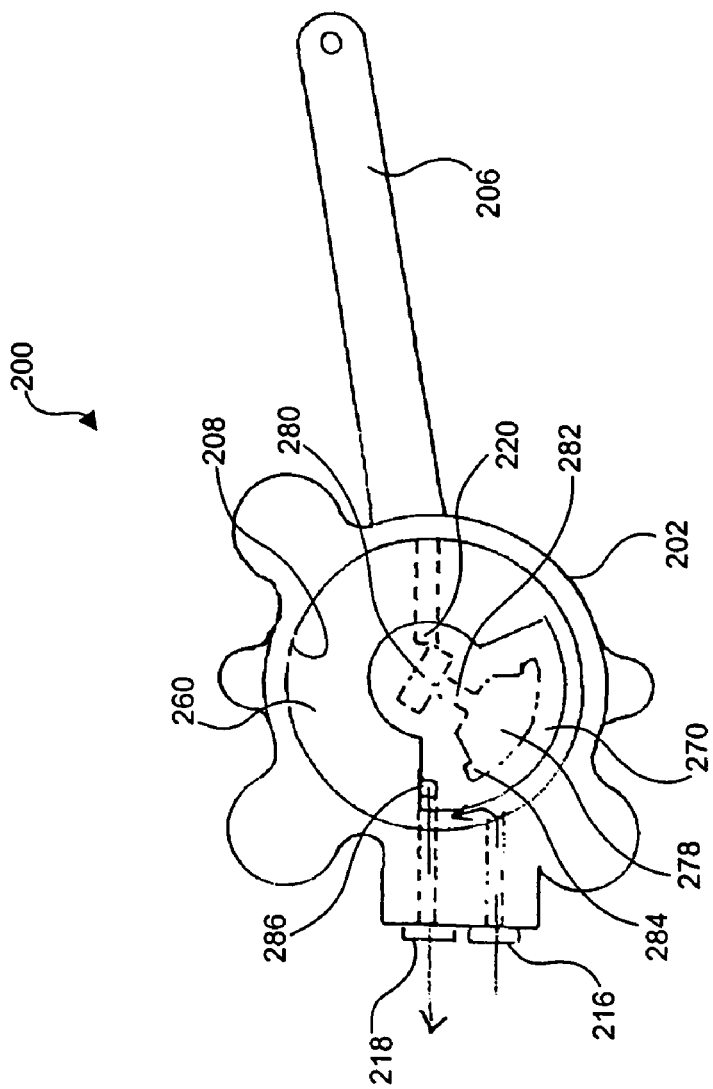
FIG. 23B is a plan view of the height control valve with universal mounting shown in the fill position.
Figure 23C:
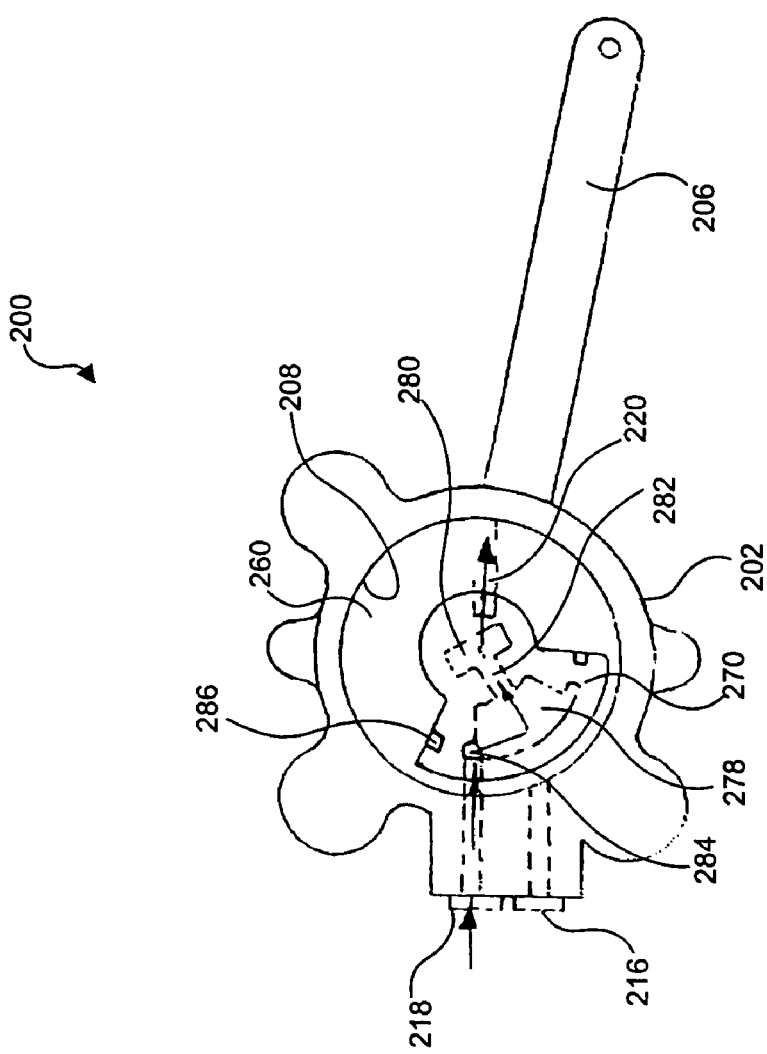
FIG. 23C is a plan view of the height control valve with universal mounting shown in the exhaust position.

Referring now to FIGS. 23A–23C, height control valve 200 utilizes a static shear disk 260 and a dynamic shear disk 270 as previously described in connection with FIGS. 7–8A.

Figure 11:
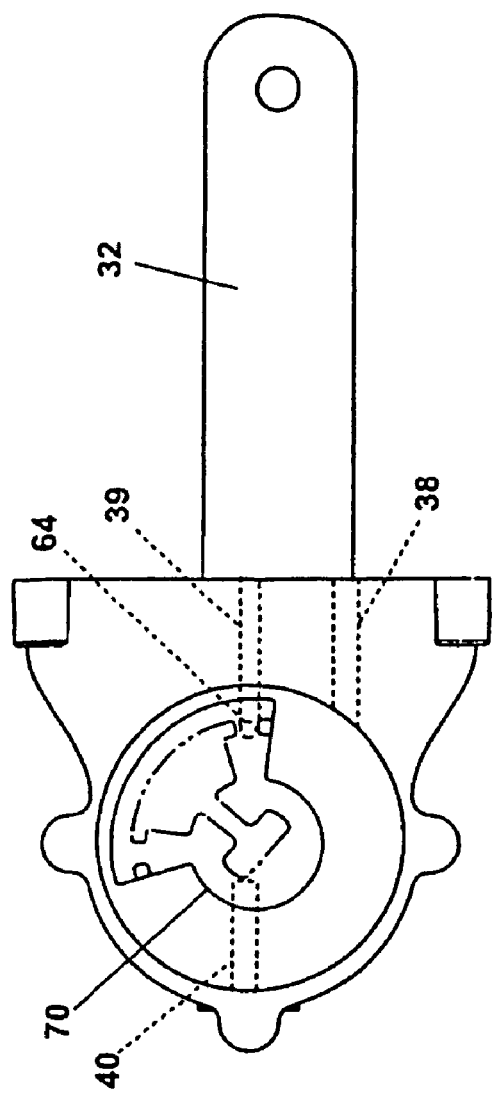
FIG. 11 is a plan view of the height control valve of FIG. 2 shown in a neutral position.

The operation of the suspension and the height control valve 200 is similar to that described in connection with FIGS. 11–13 and therefore will not be re-described here. FIGS. 11–13 however are provided according to one advantageous embodiment illustrating the relation of the mounting position for height control valve 200 relative to the movement of lever arm 206 and dynamic shear disk 270.

Figure 24A:
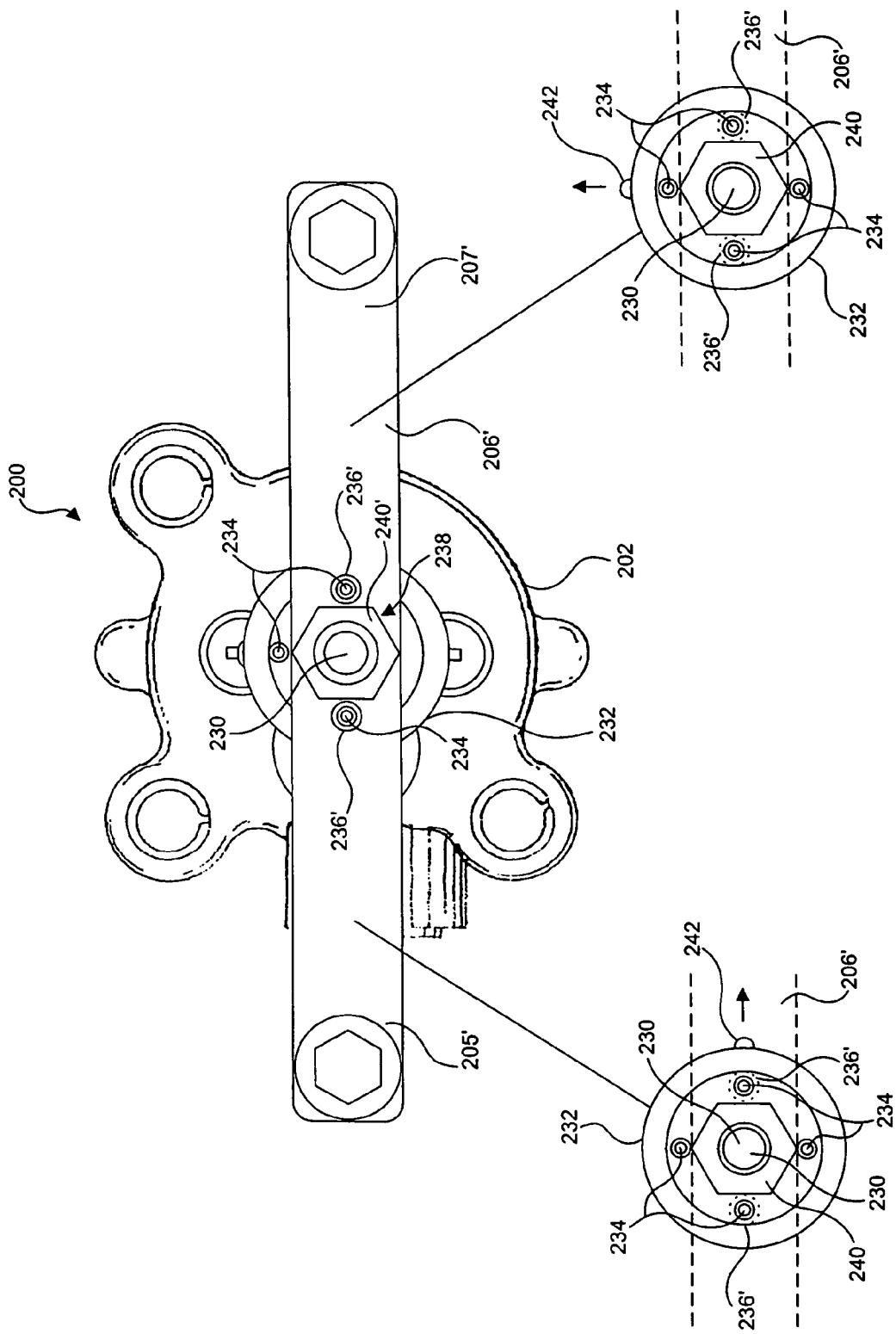
FIG. 24A is a drawing illustrating the alignment of the position indicator relative to a mounting position of the height control valve and the lever arm.
Figure 24B:
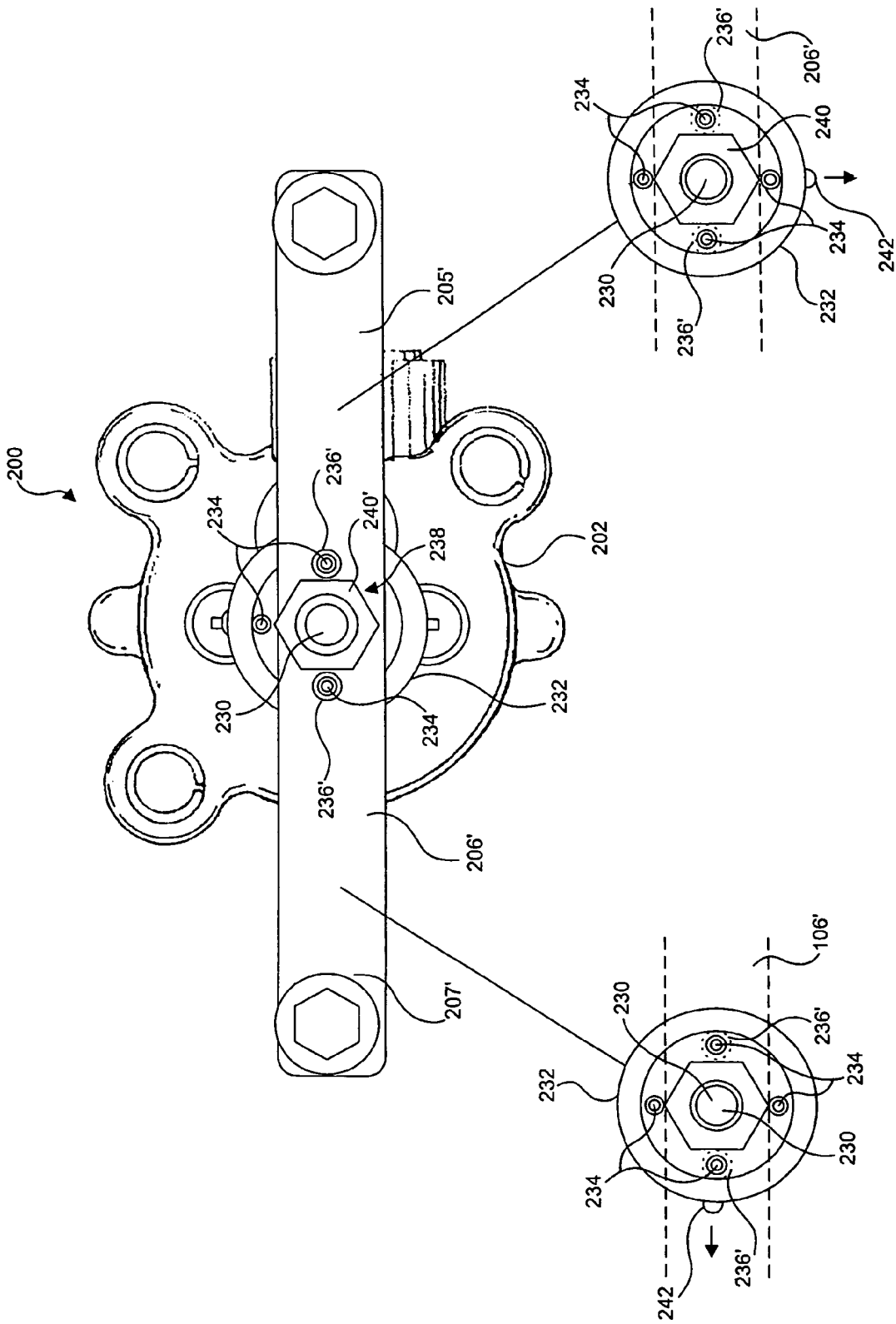
FIG. 24B is a drawing illustrating the alignment of the position indicator relative to another mounting position of the height control valve and the lever arm.
Figure 24C:
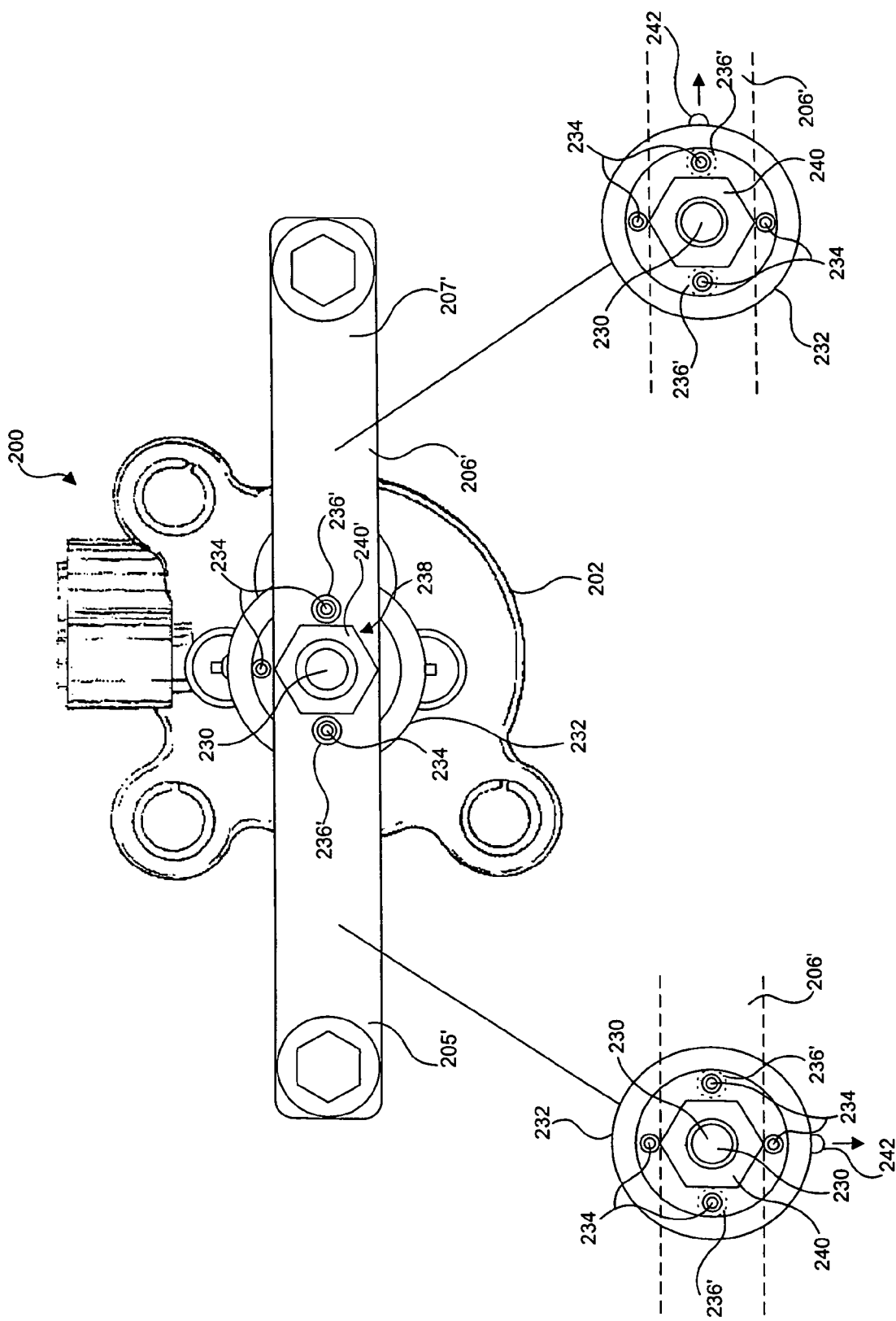
FIG. 24C is a drawing illustrating the alignment of the position indicator relative to still another mounting position of the height control valve and the lever arm.

FIGS. 24A–24C illustrate still another advantageous embodiment of the present invention. FIG. 24A depicts height control valve 200 with lever arm 206' which is coupled to shaft 230 at a mid-point of lever arm 206'. Mounted to shaft 230 is cap 232, which facilitates mounting of lever arm 206' to shaft 230. Cap 232 is provides with a plurality of mounting studs 234, which are designed to coact in part with multiple openings 236' provided in lever arm 206'. A hole 238' is provided in lever arm 206 and is designed to fit over an end of shaft 230 onto which a nut 240 is secured to rigidly fasten lever arm 206' to shaft 230.

Although lever arm 206' is illustrated as having two openings 236', it is contemplated that lever arm 206' could be supplied with four openings 236' corresponding to mounting studs 234. It should be noted that lever arm 206' may be mounted to shaft 230 in any one of four mounting positions, each progressive position rotated ninety degrees from the previous position.

Lever arm 206' may be coupled to trailing arm 302 by adjustable rod 316 connected to either the left-hand end 205' or right-hand end 207'. This embodiment provides greater flexibility to the installer to decide placement and rotation of height control valve 200. In addition, while lever arm 206' is illustrated as appearing straight, it is contemplated that it may have any number of various offsets or may comprise multiples pieces.

The rotational position of position indicator 242 when height control valve 200 is mounted as shown in FIG. 24A (i.e. with air supply port 216 and air spring port 218 left-facing when viewing the face of the valve), is indicated by two detail drawings to either side of height control valve 200. If the left-hand end of lever arm 206' is coupled to the linkage, then position indicator 242 should be aligned according to the left-hand detail. Conversely, if the right-hand end of lever arm 206' is coupled to the linkage, then position indicator 242 should be aligned according to the right-hand detail.

FIGS. 24B and 24C are similar to FIG. 24A except height control valve 200 is mounted with air supply port 216 and air spring port 218 right-facing when viewing the face of the valve for FIG. 24B, and air supply port 216 and air spring port 218 are facing upward for FIG. 24C.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A height control valve for controlling the relative height between a vehicle frame and a vehicle suspension, the height control valve comprising:

a housing defining an interior chamber and having a plurality of ports disposed at fixed locations relative to said housing for selectively operating the height control valve between fill, exhaust and neutral positions;

said housing including; a first mounting member located along an edge of the housing for mounting the height control valve to the vehicle frame; a second mounting member located along an edge of the housing for mounting the height control valve to the vehicle frame, said second mounting member being located a distance $(d_1)$ from said first mounting member; and a third mounting member located along an edge of the housing for mounting the height control valve to the vehicle frame, said third mounting member being located a distance $(d_2)$ from said second mounting member, the distance $(d_1)$ being substantially equal to the distance ($d_2$), with a first plane defined by said first mounting member and said second member being substantially orthogonal to a second plane defined by said second mounting member and said third mounting member so as to facilitate various mounting positions, each being substantially 90 degrees apart, of the height control valve relative to the vehicle frame;

a rotatable valve element located in the interior chamber of the housing;

a position indicator for said valve element to indicate the rotational position of said rotatable valve element so that upon installation of the height control valve in one of a number of the various mounting positions to the vehicle frame the valve element may be aligned with a lever arm to operate the height control valve between the fill, exhaust and neutral positions.

2. The height control valve according to claim 1 wherein said position indicator provides a visual indication of the position of said rotatable valve element.

3. The height control valve according to claim 1 wherein said position indicator comprises a protrusion.

4. The height control valve according to claim 3 wherein said protrusion is indicated on a shaft which couples said rotatable valve element with the lever arm.

5. The height control valve according to claim 1 further comprising a shaft that couples the lever arm to said rotatable valve element.

6. The height control valve according to claim 5 wherein the lever arm at one end is coupled to said shaft and at an opposite end is coupled to a linkage, which is coupled to a trailing arm.

7. The height control valve according to claim 5 wherein the lever arm is coupled to said shaft at a mid point along the lever arm and at one end is coupled to a linkage.

8. The height control valve according to claim 7 wherein either end of the lever arm is connectable to the linkage.

9. A height control valve for controlling the relative height between a vehicle frame and a vehicle suspension, the height control valve comprising:

a housing having at least three mounting members located along an edge of said housing, three of said at least three mounting members being positioned along the edge of said housing so as to define an isosceles right triangle so as to facilitate various mounting positions, each being substantially 90 degrees apart, of the height control valve relative to the vehicle frame, said housing defining an interior chamber and having a plurality of ports disposed at fixed locations relative to said housing;

a rotatable valve element located in the interior chamber for selectively operating the height control valve between fill, exhaust and neutral positions;

a position indicator for said valve element to indicate the rotational position of said valve element so that upon installation of the height control valve in one of a number of various installation positions to the vehicle frame the valve element may be aligned with a lever arm to operate the height control valve between the fill, exhaust and neutral positions.

10. The height control valve according to claim 9 wherein said position indicator provides a visual indication of the position of said valve element.

11. The height control valve according to claim 9 wherein said position indicator comprises a protrusion.

12. The height control valve according to claim 11 wherein said protrusion is indicated on a shaft which couples said valve element with the lever arm.

13. The height control valve according to claim 9 wherein the three mounting members are spaced apart from each other along the edge of the housing with the first mounting member being spaced apart from the second mounting member the same distance as the second mounting member is spaced apart from the third mounting member.

14. A method for mounting a height control valve to a vehicle frame in one of a number of various mounting positions comprising the steps of:

positioning a first mounting member to a edge of a housing of the height control valve, the housing having a plurality of ports disposed at fixed locations relative to the housing;

positioning a second mounting member to the edge of the housing a distance ($d_1$) from said first mounting member;

positioning a third mounting member to the edge of the housing a distance ($d_2$) from said second mounting member;

selecting the distance ($d_1$) to be equal to the distance ($d_2$), and selecting the positions of the first mounting member, the second mounting member and the third mounting member such that a first plane defined by the first mounting member and the second member is substantially orthogonal to a second plane defined by the second mounting member and the third mounting member;

providing a position indicator to indicate the rotational position of a rotatable valve element located in an interior chamber of the housing;

selectively mounting the height control valve to the vehicle frame in one of a number of various mounting positions, each being substantially 90 degrees apart;

aligning the position indicator with a lever arm to operate the height control valve between a fill, exhaust and neutral position.

15. The method according to claim 14 wherein said position indicator provides a visual indication of the position of said valve element.

16. The method according to claim 14 further comprising the step of coupling the lever arm to the valve element via a shaft.

17. The method according to claim 16 further comprising the steps of coupling one end of the lever arm to the shaft and coupling an opposite end of the lever arm to a linkage.

18. The method according to claim 16 further comprising the steps of coupling the shaft to a mid point along the lever arm and coupling one end of the lever arm to a linkage.

* * * * *

UNITED STATES PATENT AND TRADEMARK OFFICE
CERTIFICATE OF CORRECTION

PATENT NO. : 7,204,478 B2  Page 1 of 1
APPLICATION NO. : 10/834354
DATED : April 17, 2007
INVENTOR(S) : Victor A. Plath It is certified that error appears in the above-identified patent and that said Letters Patent is hereby corrected as shown below:

Title Page, please insert;
(60) Related U.S. Application Data:

Continuation-in-part of application No. 10/214,036, filed on August 7, 2002, now Patent No. 7,028,996.

Signed and Sealed this

Seventeenth Day of July, 2007

JON W. DUDAS
*Director of the United States Patent and Trademark Office*